US009317701B2

(12) United States Patent
Waterson

(10) Patent No.: US 9,317,701 B2
(45) Date of Patent: Apr. 19, 2016

(54) SECURITY METHODS AND SYSTEMS

(71) Applicant: SENTRYBAY LIMITED, Whangaparaoa (NZ)

(72) Inventor: David Lynch Waterson, Whangaparaoa (NZ)

(73) Assignee: SENTRYBAY LIMITED, Whangaparaoa (NZ)

(*) Notice: Subject to any disclaimer, the term of this patent is extended or adjusted under 35 U.S.C. 154(b) by 0 days.

(21) Appl. No.: 14/495,097

(22) Filed: Sep. 24, 2014

(65) Prior Publication Data

US 2015/0106923 A1 Apr. 16, 2015

Related U.S. Application Data

(63) Continuation of application No. 13/349,635, filed on Jan. 13, 2012, now abandoned, which is a continuation of application No. 12/385,268, filed on Apr. 2, 2009, now abandoned, which is a continuation-in-part of (Continued)

(30) Foreign Application Priority Data

Feb. 18, 2002 (NZ) .................................. 517257
Aug. 28, 2003 (NZ) .................................. 527881
Dec. 20, 2004 (NZ) .................................. 537327

(51) Int. Cl.
G06F 21/60 (2013.01)
G06F 21/83 (2013.01)
H04L 29/06 (2006.01)
G06F 21/55 (2013.01)
G06F 21/71 (2013.01)

(52) U.S. Cl.
CPC .............. G06F 21/60 (2013.01); G06F 21/554 (2013.01); G06F 21/606 (2013.01); G06F 21/83 (2013.01); H04L 63/0428 (2013.01); H04L 63/145 (2013.01); G06F 21/71 (2013.01)

(58) Field of Classification Search
CPC ......... G06F 21/82; G06F 21/83; G06F 21/50; G06F 21/53; G06F 21/554; G06F 21/575; G06F 21/60; G06F 21/602; G06F 21/606; G06F 21/70
USPC ................................................ 726/22, 26, 32
See application file for complete search history.

(56) References Cited

U.S. PATENT DOCUMENTS 5,355,414 A 10/1994 Hale
5,596,718 A 1/1997 Boebert
(Continued)

Primary Examiner — Kaveh Abrishamkar
Assistant Examiner — Ngoc D Nguyen
(74) Attorney, Agent, or Firm — Jacobson Holman, PLLC

(57) ABSTRACT

A system/method for preventing a computer virus from accessing message addresses is described. The system comprises an interception component or client plug-in that communicates with a messaging client and a messaging server. The interception component alters messages from the server and destined for the client. The interception component replaces message addresses in incoming messages with a unique identifier. The interception component also alters messages from the client destined for the server. The interception component replaces a unique identifier with a message addresses. A system/method for preventing keyboard sniffer programs from intercepting input, a system for preventing a computer virus from activating a send confirmation of a messaging client and a method for altering displayed objects to show encrypted data in decrypted form are also described and claimed. A system/method for reducing the impact of keyboard sniffer programs by altering keyboard input.

8 Claims, 23 Drawing Sheets

Related U.S. Application Data application No. 11/311,133, filed on Dec. 20, 2005, now Pat. No. 7,779,062, which is a continuation-in-part of application No. 10/920,268, filed on Aug. 18, 2004, now abandoned, which is a continuation-in-part of application No. PCT/NZ03/00030, filed on Feb. 18, 2003.

(60) Provisional application No. 60/409,614, filed on Sep. 9, 2002.

(56) References Cited

U.S. PATENT DOCUMENTS

| | | |
|---|---|---|
| 5,748,888 A | 5/1998 | Angelo |
| 5,771,033 A | 6/1998 | Katzenberger |
| 6,006,328 A | 12/1999 | Drake |
| 6,056,193 A | 5/2000 | McAuliffe |
| 6,134,661 A | 10/2000 | Topp |
| 6,189,105 B1 | 2/2001 | Lopes |
| 6,287,197 B1 | 9/2001 | Dickinson |
| 6,321,267 B1 | 11/2001 | Donaldson ............ 709/229 |
| 6,366,950 B1 | 4/2002 | Scheussler et al. ........ 709/206 |
| 7,263,721 B2 | 8/2007 | Kelley |
| 7,328,457 B1 | 2/2008 | Mister |
| 8,850,526 B2 * | 9/2014 | Jayaraman ............ G06F 21/51 713/165 |
| 2002/0016918 A1 | 2/2002 | Tucker |
| 2004/0215971 A1 | 10/2004 | Nam |
| 2005/0144451 A1 | 6/2005 | Voice |
| 2005/0262555 A1 | 11/2005 | Waterland |
| 2006/0036731 A1 | 2/2006 | Mossman |

* cited by examiner

SECURITY METHODS AND SYSTEMS

FIELD OF THE INVENTION

The field of the invention generally relates to the protection of computer systems through reducing the spread of viruses and reducing the impact of keylogging software.

SUMMARY OF THE PRIOR ART

Computer viruses constitute a danger for computer users and in particular companies. Many computer virus protection software programs try to prevent computer systems being infected by scanning incoming and outgoing e-mails for virus patterns. These types of virus protection programs depend upon the virus definition files being kept up to date. When a new virus appears there is a window of opportunity for viruses to spread. In even a few hours viruses can spread rapidly, worldwide.

Many viruses carry their own SMTP commands. That is they send outgoing emails without going through the email program. If a virus operates in this manner, then the only way it can replicate is by cracking the encryption technology such as the standard 128-bit encryption. Part of the encryption formula is the user-defined password this differs on each machine. Therefore, if a hacker-initiated virus breaks the encryption, it theoretically would only do so on one machine.

A problem with conventional anti virus systems that rely on standard 128-bit encryption arises via accessing the password. Keyboard sniffer programs exist that can intercept keyboard entries. It is possible (although quite difficult) for a trojan horse program to wait until the user enters a password, and then to intercept the password. Once the virus knows the password, cracking the encryption would be difficult, but possible. If the encryption were cracked, the virus could replicate through the email program, entering via the password itself. Conventional security systems do not offer any protection against password interception. Therefore, what is needed is a new security method capable of defeating a trojan horse attack that intercepts a user's password.

Another point of failure in a conventional anti virus system occurs when the user clicks a confirmation button when sending emails with attachments that could contain a virus. For example, a virus could duplicate user keystroke actions, and activate the confirmation button itself. Thus, what is needed is away to ensure that no keystrokes can activate the confirmation (for example, OK buttons can generally be activated by the Enter key in addition to a mouse click). This would ensure that the confirmation can only be activated by a user activated mouse click. Mouse clicks are far more difficult for a virus writer to duplicate.

However, it would be possible for a virus writer to establish the co-ordinates of a confirmation button on a screen, program the mouse to go to that position, and then to generate a mouse click at that position. Thus, what is needed is a method for ensuring that a virus cannot find the position of the email activation button.

Keystroke logging software programs constitute a danger to computer users in that they record and can then store sensitive information for later retrieval or send a user's sensitive data to unauthorised parties. Examples of sensitive data that computer users enter from time to time but do not want stored or distributed to unauthorised parties include: bank account numbers, credit card numbers, passwords, logon details, web sites viewed, sensitive personal information, sensitive organisational information or sensitive State information. Keystroke logging software can be an invasion of privacy and a threat to security. Keystroke logging software can easily be spread as attachments to emails or inadvertently downloaded from the internet and thus present a significant threat to computer users. Keystroke logging software can be configured to self-install in stealth and remain undetected on a user's computer, monitoring keystrokes entered into the keyboard without the knowledge of the user.

Keystroke logging software is also known as keystroke sniffing software, keyboard sniffing software, keystroke loggers, mouse click logging. This document will refer to all these types of software as keystroke logging software or keystroke loggers. Keystroke logging software forms part of the wider group of computer applications known as spyware.

Conventional methods of combating keystroke logging software include anti-spyware software that detects the existence of keystroke loggers by searching for files that match a database of signatures of known spyware. A problem with conventional anti-spyware of this nature is that they rely on the anti-spyware company quickly identifying new spyware, developing the signature, and the computer user regularly downloading the database of known signatures. Another method of thwarting keystroke loggers is to use onscreen simulated keypads. It is possible for spyware to circumvent this technique however, and users find the process unfriendly. Even if the onscreen keypad appears at a random position on the screen, it is still possible for spyware to detect the characters entered by monitoring mouse button clicks and comparing their position relative to the position of the onscreen keypad.

Another method used by anti-keystroke logging software is to monitor software running at the kernel level, and to de-activate any suspected keystroke loggers. This method has a number of dangers inherent in deactivating unassociated applications, including the risk of permanently damaging files required for the computer's operating system. Other anti-key logging approaches involve hardware devices such as smart cards or identity confirmation devices. These are expensive, difficult to deploy and are unfriendly to the user.

It is possible to develop keystroke loggers that monitor the event of a key press (a key-down event). It is also possible for keystroke loggers to harvest keystroke entries directly from the data-entry window of an application. It is also possible to monitor the keyboard driver to solicit key strokes.

SUMMARY OF THE INVENTION

Accordingly it is an object of the present invention to provide a system for overcoming the above-mentioned difficulties by interrupting the spread of viruses through the use of messaging software such as e-mail, and/or to provide a system for reducing the impact of keyloggers.

In one aspect the present invention may be said to consist in a system for preventing keyboard sniffer programs from intercepting input via a keyboard comprising: a keyboard driver for receiving an input keystroke from a keyboard, memory for storing the input keystroke, a filter driver for generating a replacement keystroke upon receiving the input keystroke to pass to an application, and a protection library for receiving the input keystroke from the memory for passing to the application.

In another aspect the present invention may be said to consist in a method of preventing keyboard sniffer programs from intercepting input via a keyboard including the steps of: receiving an input keystroke from a keyboard, storing the input keystroke in memory, in a kernel, generating a replacement keystroke for passing to an application, in an application, receiving the replacement keystroke and also receiving the input keystroke from the memory for use.

In another aspect the present invention may be said to consist a system for preventing keyboard sniffer programs from intercepting input via a keyboard comprising: a keyboard driver for receiving an input keystroke from a keyboard, memory for storing the input keystroke, a filter driver for generating a replacement keystroke upon receiving the input keystroke to pass to an application a protection library for generating random keystroke(s) for combining with the replacement keystroke, wherein the protection library receives the input keystroke from the memory.

In another aspect the present invention may be said to consist a method of preventing keyboard sniffer programs from intercepting input via a keyboard including the steps of: receiving an input keystroke from a keyboard, storing the input keystroke in memory, in a kernel, generating a replacement keystroke for passing to an application, in protection library generating random keystroke(s) for combing with the replacement keystroke, and retrieving the input keystroke from the memory for use.

In another aspect the present invention may be said to consist a system for preventing keyboard sniffer programs from intercepting input via a keyboard comprising: a protection library for receiving an input keystroke from a keyboard, the library not passing the input keystroke to an application input and diverting the input keystroke to memory, memory for storing the input keystroke, wherein the protection library generates one or more random keystrokes for passing to the application input, and the protection library utilises the input keystroke from memory.

In another aspect the present invention may be said to consist a method of preventing keyboard sniffer programs from intercepting input via a keyboard including the steps of: receiving an input keystroke from a keyboard and storing the input keystroke to memory, the input keystroke not being passed to an application input, in a protection library, generating a random keystroke for passing to the application input, via the protection library, using the input keystroke from the memory for use.

In another aspect the present invention may be said to consist a system for preventing keyboard sniffer programs from intercepting input via a keyboard comprising: a subsystem hook coupled to receive an input keystroke from a keyboard the subsystem hook adapted to generate a replacement keystroke using a function for passing to an application, a protection library for generating random keystroke(s) for passing to the application in combination with the replacement keystroke, wherein the protection library is adapted with an inverse function to regenerate the key stroke from the replacement keystroke and knowledge of the random keystroke(s).

In another aspect the present invention may be said to consist a method of preventing keyboard sniffer programs from intercepting input via a keyboard including the steps of: receiving an input keystroke from a keyboard, in a subsystem hook, generating a replacement keystroke for passing to an application, the alternative character being generated periodically and upon keyboard input using a function, regenerating the input character from using an inverse function.

Also described herein is a computer program for securing user entry data, said program executing the steps: masking user input data, receiving a request for user input data, identifying a valid requesting application in said request, and returning unmasked user input data to an identified valid requesting application.

Also described herein is a computer program for securing user entry data, wherein at the time of initialisation the computer program executes the steps of: receiving a request for a token from an application, and returning a unique token to said application in response to said request; and said program identifies a valid requesting application in a said request for user input data on the basis of the request exhibiting proof of possession of said unique token by said application.

Also described herein is a computer program for securing user entry data, wherein at said time of initialisation said program includes the step of switching to a disabled mode, wherein a warning is presented to the user and all subsequent input to the field is ignored, if a second token is requested.

Also described herein is a computer program for securing user entry data, wherein masking user input data includes: determining that a protected field has focus for user data entry; and, while said field has focus, streaming randomly generated pseudo-entry data to contaminate or replace the user entry data.

Also described herein is a computer program for securing user entry data, wherein said program extracts unmasked data by comparing contaminated data with the pseudo-entry data to extract the difference as said unmasked user input.

Also described herein is a computer program for securing user entry data, wherein masking user input data includes: determining that a protected field has focus for user data entry; and, while said field has focus, streaming randomly generated pseudo-entry data to contaminate or replace the user entry data.

Also described herein is a computer program for securing user entry data, wherein said program extracts unmasked data by comparing contaminated data with the pseudo-entry data to extract the difference as said unmasked user input.

Also described herein is a computer program for securing user entry data, wherein said step of masking user input data comprises the steps: determining that an entry field subject to protection has focus for user data entry; while said field has focus collecting said user entry data and storing the user entry data without sending the user entry data to the keyboard buffer.

Also described herein is a computer program for securing user entry data, wherein said program encrypts said stored user entry data.

Also described herein is a computer program for securing user entry data, wherein said program sends said keyboard buffer a string of randomly generated pseudo-entry characters in place of said user input data.

Also described herein is a computer program for securing user entry data, wherein said step of masking user input data comprises the steps: determining that an entry field subject to protection has focus for user data entry; while said field has focus collecting said user entry data and storing the user entry data without sending the user entry data to the keyboard buffer.

Also described herein is a computer program for securing user entry data, wherein said program encrypts said stored user entry data.

Also described herein is a computer program for securing user entry data, wherein said program sends said keyboard buffer a string of randomly generated pseudo-entry characters in place of said user input data.

Also described herein is a computer program for securing user entry data, said program executing the steps: determining that an entry field subject to protection has focus for user data entry; while said field has focus collecting said user entry data and storing the user entry data without sending the user entry data to the keyboard buffer.

Also described herein is a computer program for securing user entry data, wherein said program encrypts said stored user entry data.

Also described herein is a computer program for securing user entry data, wherein said program sends said keyboard buffer a string of randomly generated pseudo-entry characters in place of said user input data.

Also described herein is a computer program for securing user entry data, wherein said program operates under the Microsoft WINDOWS operating system, or an equivalent operating system, and said program inserts itself as a keyboard driver having highest priority in said system, at least for the duration that a protected entry field has focus.

Also described herein is a computer program for securing user entry data, wherein said program periodically checks that it still has the highest priority for the duration that the protected entry field has focus.

Also described herein is a computer program for securing user entry data, wherein said program, when initiated, disables active window hooks.

Also described herein is a computer program for securing user entry data, wherein said program modifies WINDOWS functions for returning data from a window, to return random fake data in relation to protected fields.

Also described herein is a computer program for securing user entry data, said program executing the steps: determining that an entry field subject to protection has focus for user data entry; while said field has focus masking user entry by streaming randomly generated pseudo-entry data to contaminate the user entry data, and, as necessary, extracting user entry data from said contaminated data by comparing the contaminated data with said randomly generated pseudo-entry data to extract the difference as said unmasked user input.

Also described herein is a computer program for securing user entry data, wherein said step of randomly generated pseudo-entry data comprises intermittently generating random keystroke data.

Also described herein is a system for preventing keyboard sniffer programs from intercepting input via a keyboard comprising: means for adding randomly generated characters into the keyboard buffer between password keystrokes; and means for reading said keyboard buffer; and means for reading the stream of said randomly generated characters and removing said randomly generated characters.

Also described herein is a method of preventing keyboard sniffer programs from intercepting input via a keyboard including the steps of: adding randomly generated characters into the keyboard buffer between password keystrokes; and reading said keyboard buffer; and reading the stream of said randomly generated characters and removing said randomly generated characters.

Also described herein is a system for preventing a computer virus from accessing message addresses, said system comprising an interception component adapted to communicate with a messaging client and a messaging server, said interception component including: means for altering messages from said server destined for said client including: means for identifying message addresses in messages received from said server; means for replacing an identified message address in messages received from said server with a corresponding unique identifier; and means for altering messages from said client destined for said server including: means for identifying unique identifiers in messages received from said client; and means for replacing an identified unique identifier with a corresponding message address before sending the message received from said client to said server.

Also described herein is a system for preventing a computer virus including: means for identifying message addresses in stored mail of said messaging client and/or any address books of said client or client system; and means for replacing an identified message address with a unique identifier in said stored mail and/or said any address books.

Also described herein is a system for preventing a computer virus including: means for identifying unique identifiers in stored mail of said messaging client and/or any address books of said client or client system; and means for replacing an identified unique identifier with a message address in said stored mail and/or said any address books.

Also described herein is a system for preventing a computer virus wherein: said means for replacing an identified message address in messages received from said server with a corresponding unique identifier includes on encrypting engine; and said means for replacing an identified unique identifier with a corresponding message address before sending the message received from said client to said server includes a decrypting engine.

Also described herein is a system for preventing a computer virus wherein said means for replacing an identified message address with a unique identifier in said stored mail and/or said any address books includes an encrypting engine.

Also described herein is a system for preventing a computer virus wherein said means for replacing an identified unique identifier with a message address in said stored mail and/or said any address books includes a decrypting engine.

Also described herein is a system for preventing a computer virus including: means for reconfiguring the message server settings of said messaging client to point to said interception component; and means for storing original message server settings, wherein said original message server setting are accessible by said interception component.

Also described herein is a system for preventing a computer virus including means for monitoring one or more address books, said means for monitoring including: means for identifying message addresses added to an address book; and means for replacing an identified message address with a unique identifier in said address books.

Also described herein is a system for preventing a computer virus wherein said means for replacing an identified message address with a unique identifier in said address books includes an encrypting engine.

Also described herein is a system for preventing a computer virus wherein: said encrypting engine; and said decrypting engine, include means for receiving a unique user identifier from a messaging client user.

Also described herein is a system for preventing a computer virus wherein said means for receiving a unique identifier from a messaging client user includes means for preventing keyboard sniffer programs from intercepting input comprising: means for adding randomly generated characters into the keyboard buffer between password keystrokes; and means for reading said keyboard buffer; and means for reading the stream of said randomly generated characters and removing said randomly generated characters.

Also described herein is a system for preventing a computer virus including means for preventing keystrokes activating a send confirmation of a messaging client wherein said send confirmation can only be activated by other input means.

Also described herein is a system for preventing a computer virus wherein said send confirmation is a button and including means for replacing said message send confirmation button with a graphic.

Also described herein is a system for preventing a computer virus including means for moving said graphical randomly.

Also described herein is a system for preventing a computer virus wherein said send confirmation is activated by a mouse.

Also described herein is a system for preventing a computer virus wherein said means for altering messages from said server destined for said client comprises means for receiving messages from said server and forwarding said messages to said client; and said means for altering messages from said client destined for said server comprises means for receiving messages from said client and forwarding the messages to said server.

Also described herein is a system for preventing a computer virus wherein said intervention component comprises a messaging client component for inclusion in a messaging client, said means for altering messages from said server destined for said client includes means for receiving notification of receipt of new messages from a messaging server by said messaging client, and said means for altering messages from said client destined for said server includes means for receiving notification that a message is to be sent to a messaging server by said messaging client.

Also described herein is a system for preventing a computer virus from activating a send confirmation of a messaging client comprising means for preventing keystrokes activating said send confirmation wherein said send confirmation can only be activated by other input means.

Also described herein is a system for preventing a computer virus wherein said send confirmation is a button and including means for replacing said message send confirmation button with a graphic.

Also described herein is a system for preventing a computer virus including means for moving said graphical randomly.

Also described herein is a system for preventing a computer virus said send confirmation is activated by a mouse.

Also described herein is a system for preventing keyboard sniffer programs from intercepting input via a keyboard comprising: means for adding randomly generated characters into the keyboard buffer between password keystrokes; and means for reading said keyboard buffer; and means for reading the stream of said randomly generated characters and removing said randomly generated characters.

Also described herein is a method of preventing a computer virus from accessing message addresses, including the steps of: altering messages from a messaging server destined for a messaging client including: identifying message addresses in messages received from said server; replacing an identified message address in messages received from said server with a corresponding unique identifier; and altering messages from said client destined for said server including: identifying unique identifiers in messages received from said message client; and replacing an identified unique identifier with a corresponding message address before sending the message received from said client to said server.

Also described herein is a method of preventing a computer virus method of preventing a computer virus from accessing message addresses as claimed in claim 23 including the steps of: identifying message addresses in stored mail of said messaging client and/or any address books of said client or client system; and replacing an identified message address with a unique identifier in said stored mail and/or said any address books.

Also described herein is a method of preventing a computer virus including the steps of: identifying unique identifiers in stored mail of said messaging client and/or any address books of said client or client system; and replacing an identified unique identifier with a message address in said stored mail and/or said any address books.

Also described herein is a method of preventing a computer virus wherein: replacing an identified message address in messages received from said server with a corresponding unique identifier includes the step of encrypting said message address; and replacing an identified unique identifier with a corresponding message address before sending the message received from said client to said server includes the step of decrypting said unique identifier.

Also described herein is a method of preventing a computer virus wherein said step of replacing an identified message address with a unique identifier in said stored mail and/or said any address books includes the step of encrypting said message address.

Also described herein is a method of preventing a computer virus wherein step of replacing an identified unique identifier with a message address in said stored mail and/or said any address books includes the step of decrypting said unique identifier.

Also described herein is a method of preventing a computer virus including the steps of: reconfiguring the message server settings of said messaging client; and storing original message server settings, wherein said original message server setting are used when receiving messages from said messaging server; and forwarding message to said server.

Also described herein is a method of preventing a computer virus including the step of monitoring one or more address books, said step of monitoring including the steps of identifying message addresses added to an address book; and replacing an identified message address with a unique identifier in said address books.

Also described herein is a method of preventing a computer virus wherein said step of replacing an identified message address with a unique identifier in said address books includes the step of encrypting said message address.

Also described herein is a method of preventing a computer virus wherein said steps of: encrypting said message address; and decrypting said unique identifier include the step of receiving a unique user identifier from a messaging client user.

Also described herein is a method of preventing a computer virus wherein said steps of receiving a unique identifier from a messaging client user includes the step of preventing keyboard sniffer programs from intercepting input including the steps of adding randomly generated characters into the keyboard buffer between password keystrokes; and reading said keyboard buffer; and reading the stream of said randomly generated characters and removing said randomly generated characters.

Also described herein is a method of preventing a computer virus including the steps of preventing keystrokes activating a send confirmation of a messaging client wherein said send confirmation can only be activated by other input means.

Also described herein is a method of preventing a computer virus wherein said send confirmation is a button and including the step of replacing said message send confirmation button with a graphic.

Also described herein is a method of preventing a computer virus including the steps of moving said graphical randomly.

Also described herein is a method of preventing a computer virus wherein said send confirmation is activated by a mouse.

Also described herein is a method of preventing a computer virus wherein said step of altering messages from a messaging server destined for a messaging client includes receiving messages from a messaging server and forwarding said messages to a messaging client; and said step of altering messages from said client destined for said server includes receiving messages from said client and forwarding the messages to said server.

Also described herein is a method of preventing a computer virus wherein said step of altering messages from a messaging server destined for a messaging client includes receiving notification of receipt of new messages from a messaging server by said messaging client, and said step of altering messages from said client destined for said server includes receiving notification that a message is to be sent to a messaging server by said messaging client.

Also described herein is a method of preventing a computer virus wherein said send confirmation can only be activated by other input means.

Also described herein is a method of preventing a computer virus wherein said send confirmation is a button and including the step of replacing said message send confirmation button with a graphic.

Also described herein is a method of preventing a computer virus including the step of moving said graphical randomly.

Also described herein is a method of preventing a computer virus wherein said send confirmation is activated by a mouse.

Also described herein is a method of preventing keyboard sniffer programs from intercepting input via a keyboard including the steps of: adding randomly generated characters into the keyboard buffer between password keystrokes; and reading said keyboard buffer; and reading the stream of said randomly generated characters and removing said randomly generated characters.

Also described herein is a system comprising: an email or messaging server which sends and receives messages including a message address; an email or messaging interface which replaces said external address with a unique identifier; and an email or messaging client which sends and receives messages including a unique identifier.

Also described herein is a system for preventing a computer virus from accessing message addresses, said system comprising an interception component adapted to communicate with a messaging client and a messaging server, said interception component including: means for receiving messages from said server and forwarding said messages to said client; means for identifying message addresses in messages received from said server; and means for replacing an identified message address in messages received from said server with a corresponding unique identifier.

Also described herein is a system for preventing a computer virus from accessing message addresses, said system comprising an interception component adapted to communicate with a messaging client and a messaging server, said interception component including: means for receiving messages from said client and forwarding the messages to said server; means for identifying unique identifiers in messages received from said client; and means for replacing an identified unique identifier with a corresponding message address before sending the message received from said client to said server.

Also described herein is a method of changing data within a data object comprising the steps of receiving notification that a user has selected said object; changing the contents of the said object by decrypting all or part of the contents of the object; and displaying at least part of said changed object.

Also described herein is a method of changing data within a data object comprising the steps of: receiving notification that said user has de-selected said object; and changing the contents of said object by encrypting all or part of the contents of the object.

Also described herein is a method of changing data within a data object wherein said method is used within an email application and said email application provides the notification of change.

Also described herein is a method of changing data within a data object wherein said method is used within a file system program and said file system display program provides said notification.

Also described herein is a method of changing data within a data object wherein said part of the content encrypted and decrypted is an email address.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner. To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION OF THE PRESENT INVENTION

Virus Prevention

Conventional anti-virus software attempts to prevent viruses from entering and leaving the system, by examining incoming and outgoing messages and attempting to identify possible viruses. In contrast, an aspect of the present invention stops viruses from replicating, by preventing viruses from spreading to other systems through the use of message addresses such as e-mail addresses.

Figure 1:
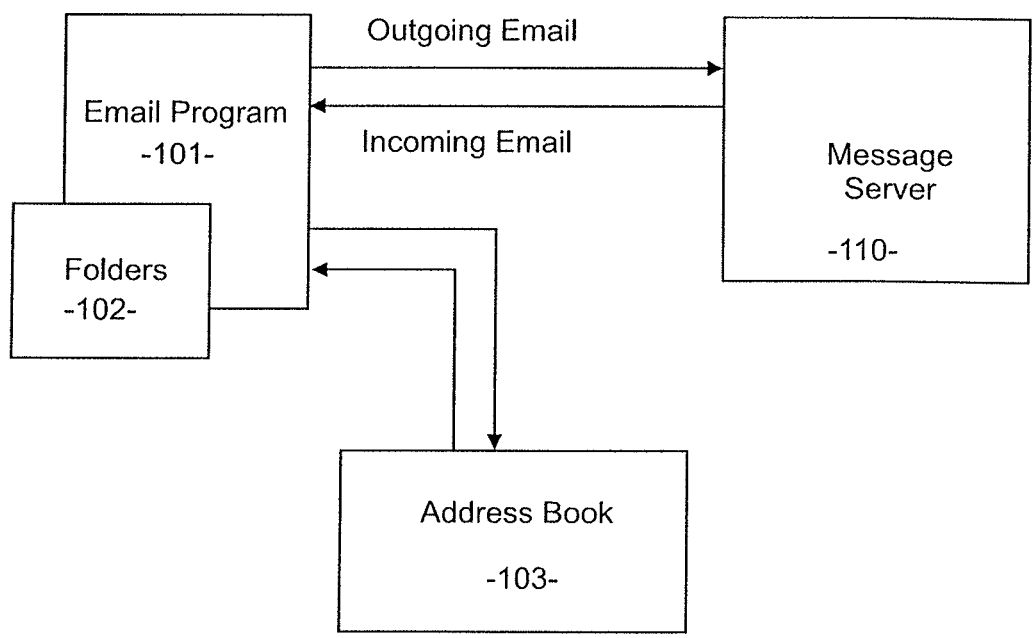
FIG. 1 is a diagrammatic representation of a conventional message client program including message folders and message address book.

Many viruses replicate by using message addresses found on the infected system. Viruses source message addresses in order to replicate. FIG. 1 shows a typical prior art messaging system. A messaging client 101 connects to a messaging server 110. The client may use an address book 103 for storing email addresses and store messages in message folders 102. Viruses source message addresses by checking folders 102 accessed from within messaging programs such as client 101. Folders 102 such as Inbox, Sent box, Outbox, Drafts, are used for storing messages. Message addresses found in the headers of individual messages are used to replicate the virus.

Another source of message addresses for replicating is the address book 103 that stores details of contacts including message addresses. The virus may then proceed to send itself to the located addresses using its own embedded mail daemon.

The software according to at least one aspect of the present invention encrypts messaging addresses in order to prevent viruses using the addresses. In order to encrypt email addresses within a message, the software first identifies email addresses and then reversibly encrypts the email address and resaves the message. The software intercepts messages being sent to the email client and encrypts addresses immediately. The software intercepts emails being sent and replaces the encrypted addresses with real addresses before the emails reach the server.

In the preferred embodiment, the present invention interacts with an email messaging program and in particular Microsoft Outlook. The present invention can be programmed as a Microsoft Outlook plug-in or as a plug-in for any suitable email client. Alternatively the present invention can be programmed as an executable or library for an suitable messaging client.

Once installed on a computer system the software requests the messaging client application for notification of certain events. These events include when a new message has been received, when a message is about to be sent, when a user has highlighted a particular message or a group of messages, and when a user has added a new address to an address book or modified an existing address in an address book.

Figure 5:
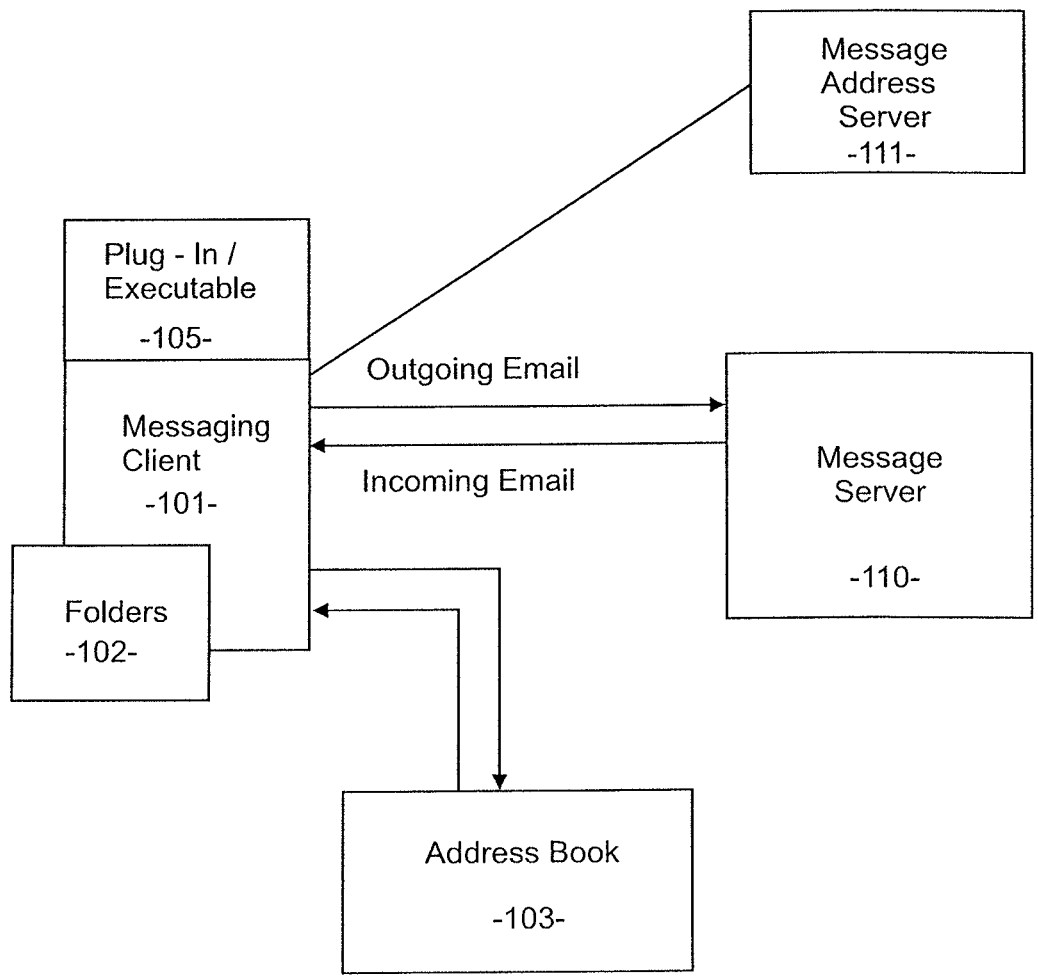
FIG. 5 is a block diagram of the messaging system of a further embodiment of the present invention.

Referring to FIG. 5 one preferred embodiment of the messaging system of the present invention is represented. The protection plug-in 105 is integrated with the messaging client 101. The protection plug-in 105 has a number of modules.

The protection system 105 has a find address module to locate messaging addresses in messages and address book entries. The find address module passes located addresses to an encrypting module that has both encrypting and decrypting functions. The encrypting module encrypts message addresses and passes the encrypted address back to the find address module as a unique identifier to replace the message address.

The protection system 105 also has a find identifier module that is used to locate the unique identifier that has replaced the message address. The find identifier module passes the located identifier to the encrypting module for decrypting, receives a message address from the encrypting module and replaces the unique identifier with the message address.

The protection system 105 also has an address book module to monitor the address book 103 of the messaging client 101. When this module is notified of new address entries, the module passes the message address to the encrypting module, receives the encrypted address from the encrypting module and replaces the address in the address book 103 with the encrypted address.

When protection system 105 is installed it requests notification by the messaging client 101 when a new message is received and when a message is about to be sent.

The protection system 105 also includes a scanning module for scanning message folder 102 and message address book 103. The scanning module uses the find address module to locate message addresses and the encrypting module to encrypt any message addresses found.

During installation the installation component of protection system 105 uses the scanning modules and encrypting modules to encrypt message addresses in message folders 102 and message addresses in address books 103.

After a user composes a new outgoing message, and causes the messaging client 101 to send the message, the protection system 105 receives notification that a message is about to be sent. Encrypted addresses within the message are then decrypted before the message is sent to the server 110.

On receipt of a new message, the protection system 105 is notified and any addresses in the message are encrypted by the encryption module. All message addresses entering the messaging client are thus encrypted.

As all new message addresses are encrypted, when messages are subsequently saved in the various folders 102 within the messaging client 101, such as the Inbox, they are stored with encrypted message addresses. Message addresses stored in the address book 103 are also stored in an encrypted form as the addresses have been encrypted when messages enter the system.

The address book 103 is where details of contacts are stored, including message addresses. In the case of Microsoft Outlook Express, this is the Windows Address Book (WAB). The interception component monitors all changes to the address book. Whenever a new contact is added, the address book monitoring module of protection system 105 encrypts the message address.

The software uses an encryption key, unique to each user, to prevent viruses from decrypting message addresses. This technique makes it difficult for a virus to duplicate entries from a user.

Further the software can be used with message address servers 111 such as Microsoft Exchange or an LDAP Server. Address servers 111 store public addresses such as those addresses required to locate local users of the system and message addresses located outside the system. When composing a new message, the messaging client 101 may request addresses from a message address server 111. The protection system 105 receives notification of the reply and encrypts the addresses. The outgoing message is then sent in the normal way.

The protection system 105 of the present invention also provides the ability to decrypt and encrypt multiple message, folders or address books at once.

Figure 2A:
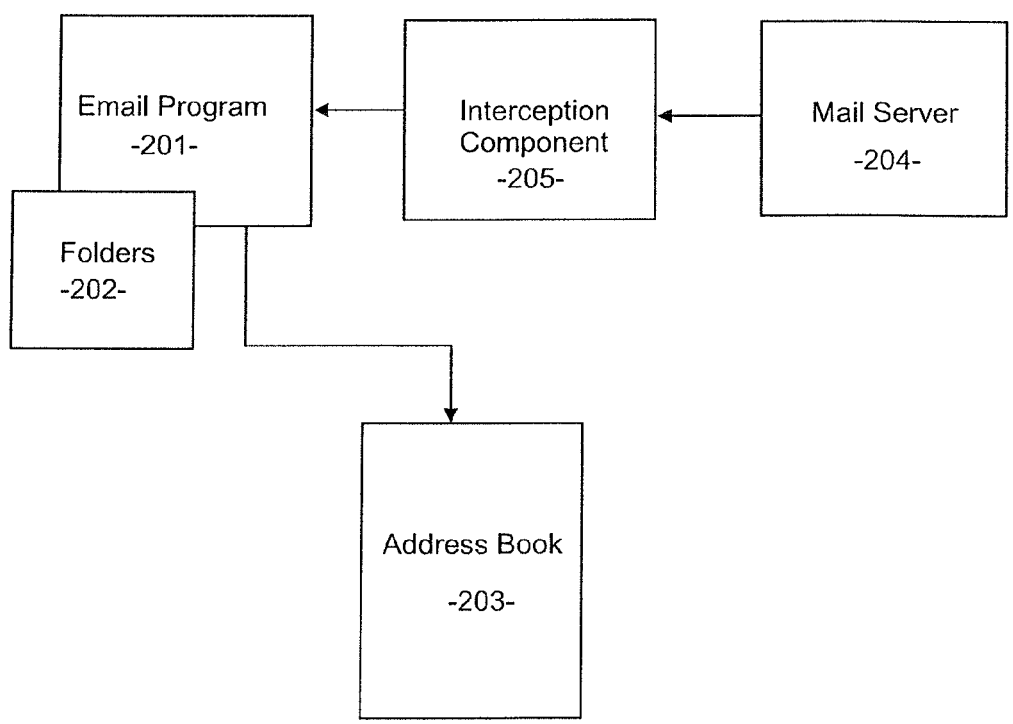
FIG. 2A is a diagrammatic representation of a system for receiving incoming email according to one aspect of present invention.
Figure 2B:
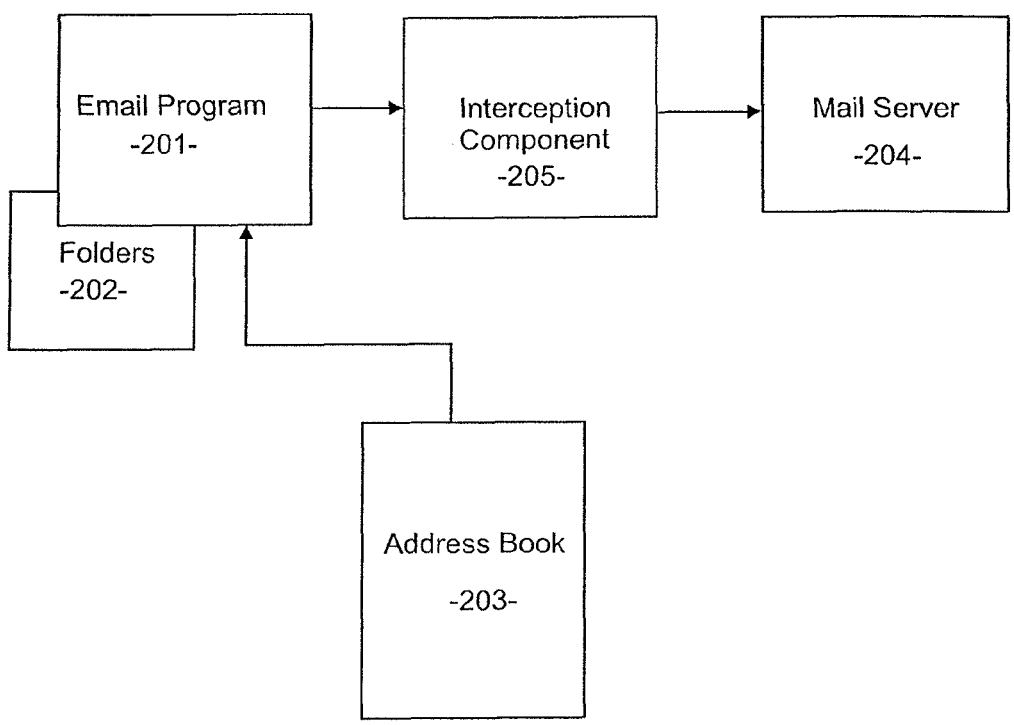
FIG. 2B is a diagrammatic representation a system for sending outgoing email according to one aspect of present invention.

Referring to FIGS. 2A and 2B, the software implementing a further embodiment of the present invention includes an interception component 205 as part of an application program that operates on the same environment as the client messaging program 201 independently of the email client. The interception component 205 acts as an intermediary between the messaging client 201 and the messaging server 204, encrypting and decrypting message addresses. In the embodiment previously described the interception component was implemented as a plug-in.

During installation, according to an aspect of the invention, an installation component of the application program changes the messaging server settings of the messaging client 201 to refer to the interception component 205 instead of the messaging server 204. With respect to the messaging client 201, the interception component 205 acts as a messaging server. With respect to the messaging server 204, the interception component acts a client messaging program.

The interception component 205 of the present invention comprises an application program running on a computer. The application program has a module to receive messages from a messaging client 201 and a module to send messages to a messaging client 201. To communicate with a messaging server 204 the application program of interception component 205 has modules to send messages to the messaging server 204 and receive messages from the messaging server 204. The messaging client 201 receiving and sending modules and the server 204 receiving and sending modules implement the functionality of standard client and server messaging protocols.

The application program of interception component 205 has a find address module to locate messaging addresses in messages received from the messaging server 204. The find address module passes located addresses to an encrypting module that has both encrypting and decrypting functions. The encrypting module encrypts message addresses and passes the encrypted address back to the find address module as a unique identifier to replace the message address.

A find identifier module is used to locate the unique identifier that has replaced the message address. The find identifier module passes the located identifier to the encrypting module for decrypting, receives a message address from the encrypting module and replaces the unique identifier with the message address. The interception component 205 also has an address book module to monitor the address book 203 of the messaging client 201. This module detects new addresses added to the address book, passes the message address to the encrypting module, receives the encrypted address from the encrypting module and replaces the address in the address book 203 with the encrypted address.

The application program of interception component 205 includes an installation component which uses the scanning modules and encrypting modules to encrypt message addresses in message folders 202 and message addresses in address books 203. The installation component has functions to replace the messaging server settings of the messaging client 201 and store the existing messaging server settings of the client 201 in the application program of interception component 205 for use by the modules that send and receive messages for the messaging server 204.

The application program also includes a scanning module message folder and a message address book scanning module. Each scanning module uses the find address module to locate message addresses and the encrypting module to encrypt any message addresses found.

Figure 3:
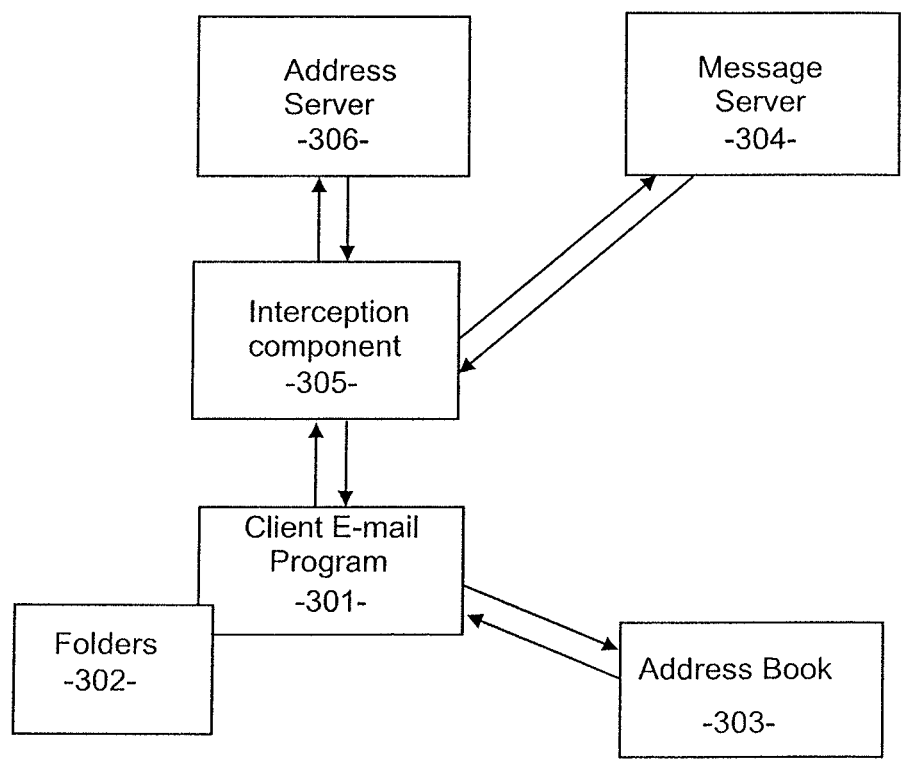
FIG. 3 is a diagrammatic representation of the system operating in an environment including a message address server according to one aspect of the present invention.

Referring to FIG. 3 a module of the interception component 305 to interface with a messaging address server 306 has functions to interact with both messaging clients 301 and messaging address server 306. The module receives requests for an address from the client 301 and forwards the requests to the server 306. After receiving the message address from server 306 the module passes the address to the encrypting module, receives the encrypted address and forwards the encrypted address to the messaging client 301.

The operation of the system of this embodiment of the address encryption aspect of the present invention in use is described with reference to FIG. 3 as follows. After a user composes a new outgoing message, and sends a message, the messaging client 301 forwards the message to the interception component 305. The interception component 305 decrypts the message address data and sends the message onto the messaging server 304.

To receive a new message, a user requests that the messaging client 301 check for new messages, the messaging client 301 requests that the interception component 305 checks with the messaging server 304 if there are new messages. If there are, the interception component 305 downloads the messages, identifies and encrypts the message addresses, and then passes the messages onto the messaging client 301. All message addresses entering the messaging client are thus encrypted.

Messaging clients may be set up to automatically check to see if there are new messages. In this case the messaging client 301 checks for new messages by checking with the interception component 305. The interception component 305 in turn checks with the messaging server 304. If there are new messages the interception component encrypts the addresses and forwards the messages to the client 301 in the same way as if the user had made the request to check for new mail.

As all message addresses entering the messaging client 301 are encrypted, when messages are subsequently saved in the various folders 302 within the messaging client 301, such as the Inbox, they are stored with encrypted message addresses. Message addresses stored in the address book 303 are also stored in an encrypted form as the addresses have been encrypted when messages enter the system.

The address book 303 is where details of contacts are stored, including message addresses. In the case of Microsoft Outlook Express, this is the Windows Address Book (WAB). The interception component monitors all changes to the address book. Whenever a new contact is added, the address book monitoring module of interception component 305 will encrypt the message address.

When the system component is installed for the first time, the installation component encrypts all existing message addresses found in the various folders 303 of the client message program 301, as well as all message addresses found in the address book 303.

The interception component uses an encryption key, unique to each user to prevent viruses from activating the interception component 304 in order to use it to decrypt message addresses. This technique makes it difficult for a virus to duplicate entries from a user.

The interception component can be used with message address servers 306 such as Microsoft Exchange or an LDAP Server. Address servers 306 store public addresses such as those addresses required to locate local users of the system and message addresses located outside the system. When composing a new message, the messaging client 301 may request addresses from a message address server 306, the interception component 305 intercepts the request, makes the request of the message address server 306, receives the address and encrypts the addresses before forwarding onto the messaging client 301. The message is then sent in the normal way with the interception component 305 decrypting the message address before forwarding the message onto the messaging server 304.

Figure 4A:
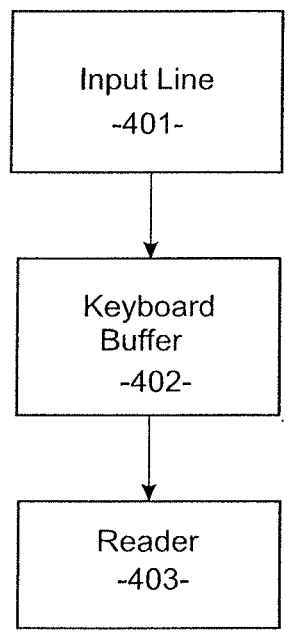
FIG. 4A is a diagrammatic representation of the operation of a conventional Keyboard Buffer.

An additional safeguard provided by a further aspect of the present invention against keystroke loggers and sniffer programs is described with reference to FIGS. 4A and 4B. Referring to FIG. 4A, a conventional keyboard buffer 402 receives input data from a keyboard (not shown) over an input line 401. The contents of the buffer are read by a relevant software program over a suitable connection at 403.

Figure 4B:
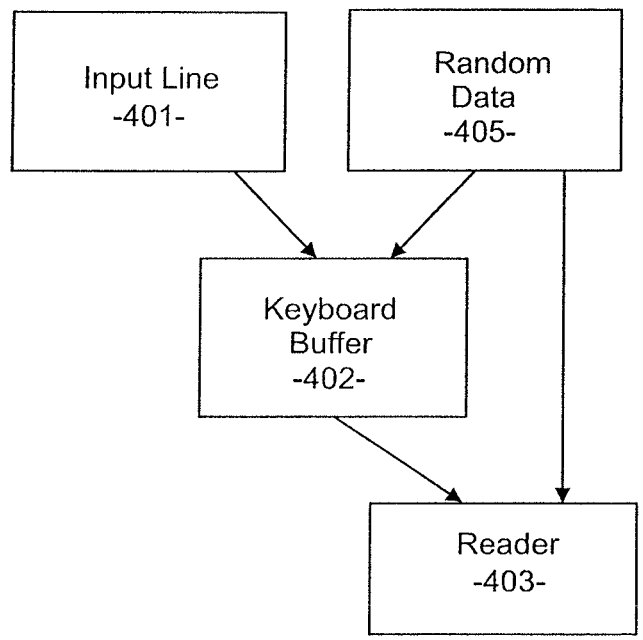
FIG. 4B is a diagrammatic representation of the operation of a Keyboard Buffer when awaiting password input from the keyboard according to an aspect of the present invention.

Referring to FIG. 4B, an aspect of the present invention provides a keyboard buffer scrambling feature that adds randomly-generated characters into the keyboard buffer 402 between the password keystrokes which are input at 401 into keyboard buffer 402 from a keyboard or other or other data entry device. It will be appreciated that this aspect totally defeats keyboard sniffer programs. A Trojan horse program attempting to intercept a user's password only would receive a lot of meaningless characters.

As shown in FIG. 4B, a continuous stream of random characters are generated from a buffer scrambler 405 that randomly streams data in while someone enters a password to help prevent the password being picked up by a keyboard sniffer program. The buffer scrambler 405 comprises a random number generator, which also can be a cryptographic accelerator or other means for providing a variable and unpredictable stream of random characters that are sent as a data input 401 to the keyboard buffer 402. The contents of the keyboard buffer 402 are then read at 403 by a reader which is coupled with or otherwise has access shown at 407 to the random character stream provided by buffer scrambler 405. The reader 403 deletes the random characters inserted in the input data 401 from the contents of keyboard buffer 402.

By comparing the random characters with the contents of keyboard buffer 402, the reader 403 is able to reconstruct original (correct) input data 401 from the keyboard. Unauthorized software (such as keyboard buffer sniffer software) is able to access reader 403, but cannot determine the random character stream at 405 and is therefore unable to determine the input data 401.

Figure 6:
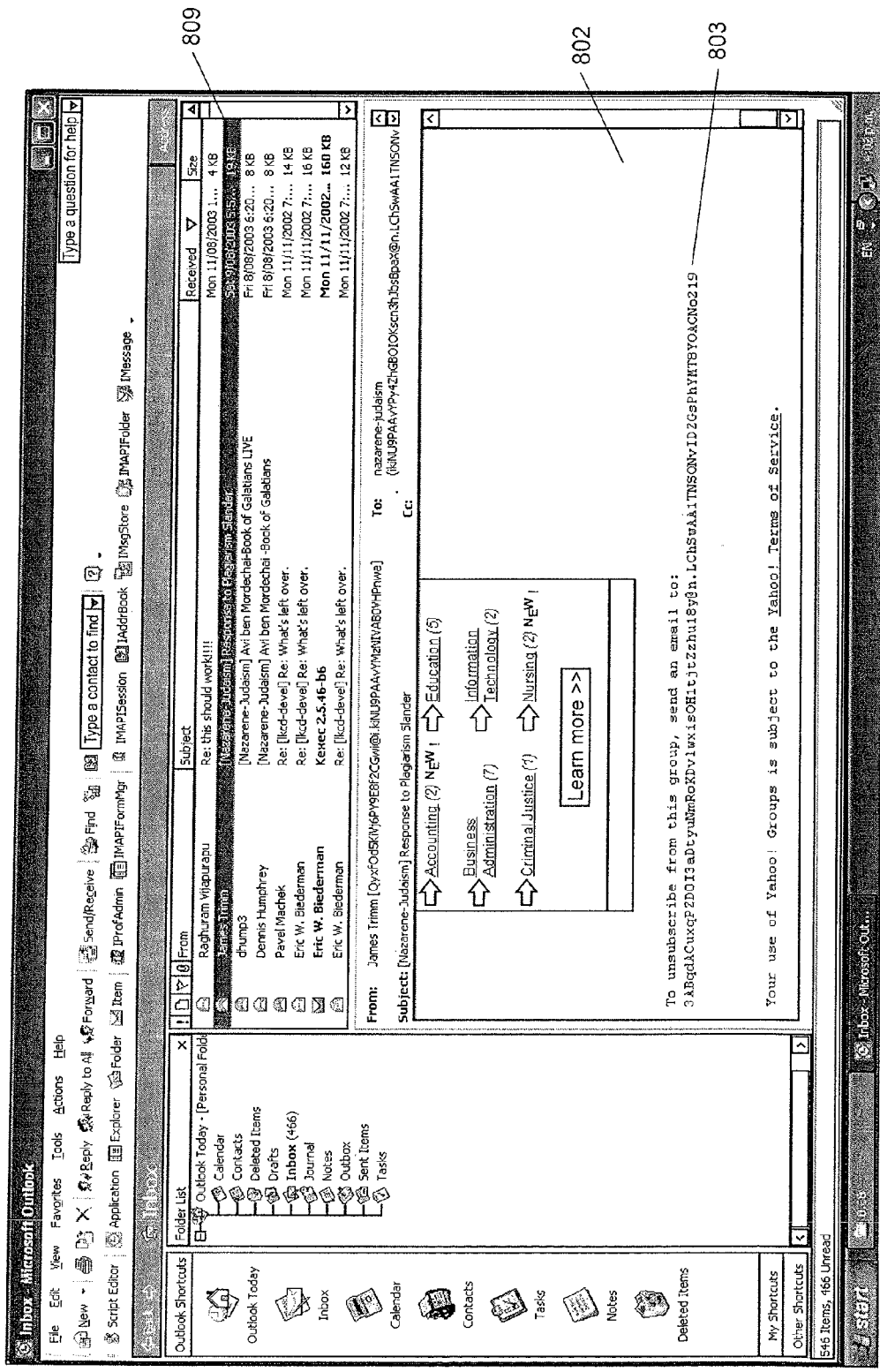
FIG. 6 is a screen shot showing Outlook™ with a message with message addresses encrypted.
Figure 7:
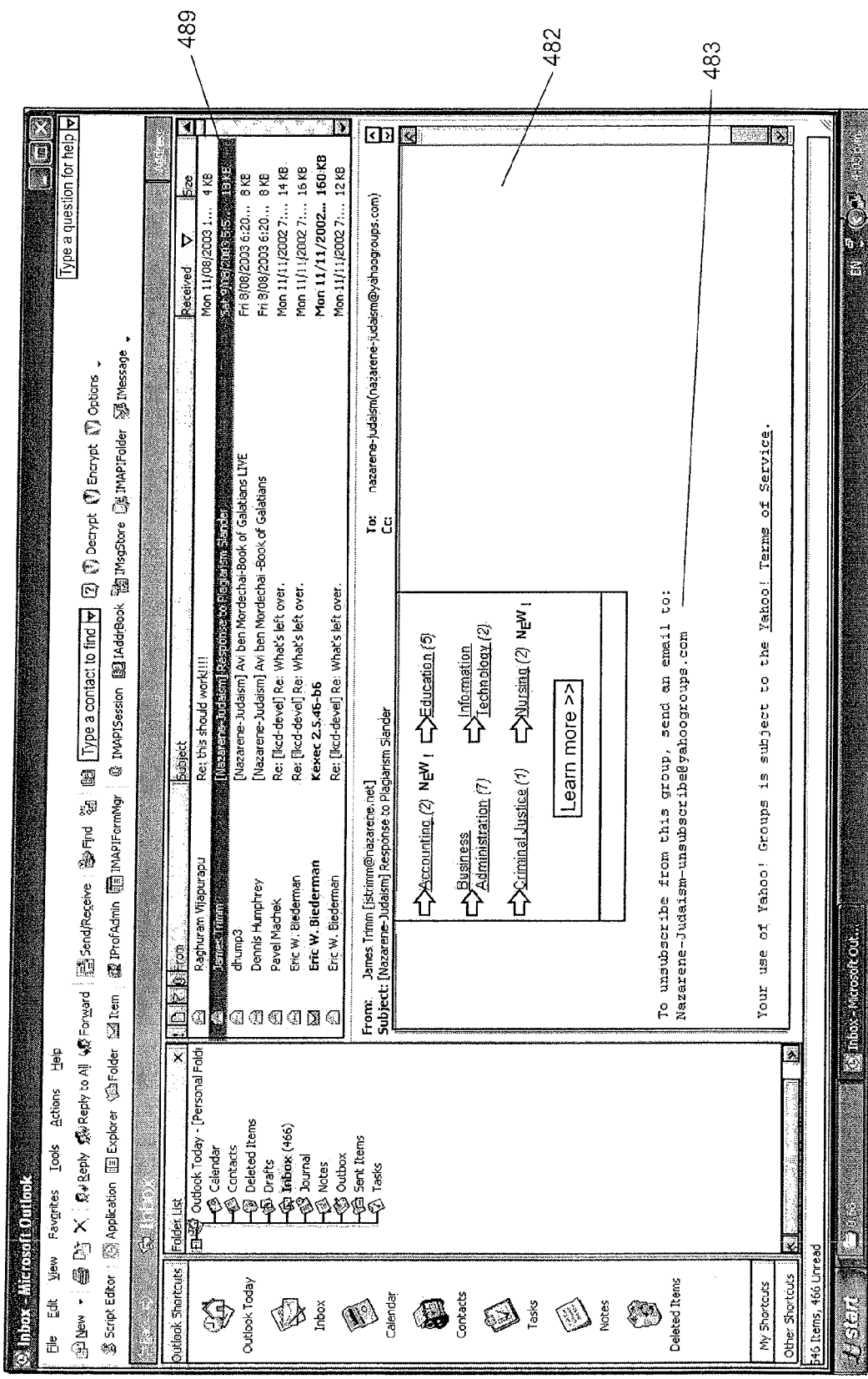
FIG. 7 is a screen shot showing Outlook™ with a message with message addresses not encrypted.

A further aspect of the invention will be described with reference to FIGS. 6 to 8. In FIG. 6A 801 operating with address encryption as set forth above is shown. When a message, file, object or link to a message, file or object is selected any address content of that message appears in encrypted form. In FIG. 6 at 802 the contents of a message folder are shown. The addresses 803 in the messages contained in the folder are encrypted or otherwise changed so they are not readable.

When a user using a mouse or other means selects the link 809 to a message, the message 802 is displayed with encrypted addresses. However according to this further aspect of the invention the software proceeds to alter the message to remove encryption and make all email addresses in that message readable.

The protection system 105 upon receipt of the notification that the link is selected alters and in the preferred embodiment decrypts part of or all of the content of the message including the header information and makes it available to the user. Referring to FIG. 7 the message 482 displayed in the messaging client 481 is now displayed with the decrypted email address 483.

Upon notification that the link 489 has been de-selected the protection system 105 re-alters the data so that it includes the encrypted address. In the preferred embodiment the invention encrypts email address within the data so that the email addresses cannot be used to send messages.

Figure 8:
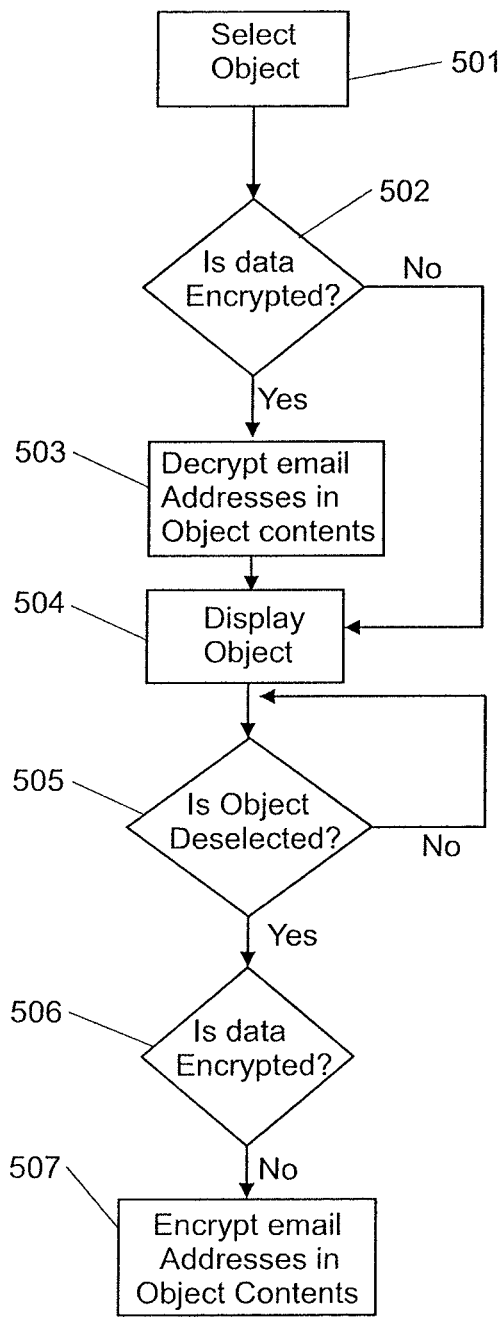
FIG. 8 is a flow diagram of a method according to a further invention herein.

This process is illustrated in FIG. 8. When a user selects an object the protection system 105 is notified at step 501 and proceeds to step 502. At step 502 the system 105 checks to see if the object is encrypted. If the object is encrypted the protection system 105 proceeds to step 503 and the system then proceeds to step 504 and displays the decrypted object. If the object was not encrypted the protection system proceeds directly from step 502 to step 504 then it is just displayed.

The protection system 105 then waits at step 505 for notification that the object has been deselected. When the system 105 receives the notification it checks at step 506 whether the data is encrypted. If the data is not encrypted the protection system 105 proceeds to step 507 and encrypts the object.

In addition to replacing email addresses with identifiers the system on startup checks that files that could alter a message just before a message leaves the system are unchanged. The system does this by comparing the checksum of critical files with a stored checksum of those files.

As a further means to prevent viruses utilizing a messaging client to send out email the present invention modifies the messaging client to prevent the message send confirmation being activated by keystrokes. In addition the present invention replaces any button confirmation with a graphic confirmation. As a further protection the graphic confirmation is moved to a different location either at each login or each time a user prepares an email to send. This prevents a virus writer from establishing the coordinates of the graphic and programming the mouse to go to that position. The email client is modified by the installation component of the present system.

While the invention has been described in connection with what are presently considered to be the most practical and preferred embodiments, it is to be understood that the invention is not limited to the disclosed embodiments, but rather is intended to cover various modifications and equivalent arrangements which are included with the scope of the claims.

For example, the features of the invention are compatible with WAP or any mobile device enabling standard. Thus, an equivalent arrangement can be accomplished by implementing the keyboard buffer scrambling feature as well as other features described above in a PDA, cell phone or other computing device. Accordingly, persons of ordinary skill in this field are to understand that all such equivalent arrangements are to be included within the scope of the claims.

Anti-keylogging

Conventional spyware attempts to prevent keystroke logging software from harvesting keystrokes entered by the user by searching for the existence of known keyloggers on the user's system.

In contrast, one improvement offered by the present invention prevents key stroke loggers from logging sensitive information from the keyboard buffer by obscuring the sensitive data with random data for direct access by the underlying application in secure memory and supplies random replacement data to password fields in the data entry window.

Another improvement offered by the present invention prevents, key stroke loggers from harvesting keystrokes from the keyboard driver by placing a filter on the output of the keyboard driver that replaces actual keystrokes with fake, randomly-generated characters.

Another improvement offered by the present invention prevents key stroke loggers from harvesting keystrokes from the data entry window by replacing actual keystrokes with fake, randomly-generated characters.

Generally each data entry field of a data entry window is a program performing certain standard functions while the entry field has focus. For example the data entry field may display the characters entered in the entry field or may display an indication that characters have been entered without displaying the characters themselves, for example by displaying a series of asterisks. The data entry field computer code also controls the behaviour of the data entry field. For example the data entry field may include pull down lists or election lists or similar. Once it no longer has focus the data entry field will eventually return entered data to the data entry window program that it is associated with. The data entry window program that then passes the information to the underlying application which requires the information and which initialised the data entry window.

One preferred form of the present invention is a modified data entry field exhibiting some altered behaviours that resist keystroke logging attempts that can occur within the various implementation levels of a computer based system. The various implementation levels are typically known as the kernel, shell and application levels.

Another form of the invention does not require a modified data entry field. Instead the program detects and then protects passwords on password-fields, and other data on all other entry fields.

Figure 14:
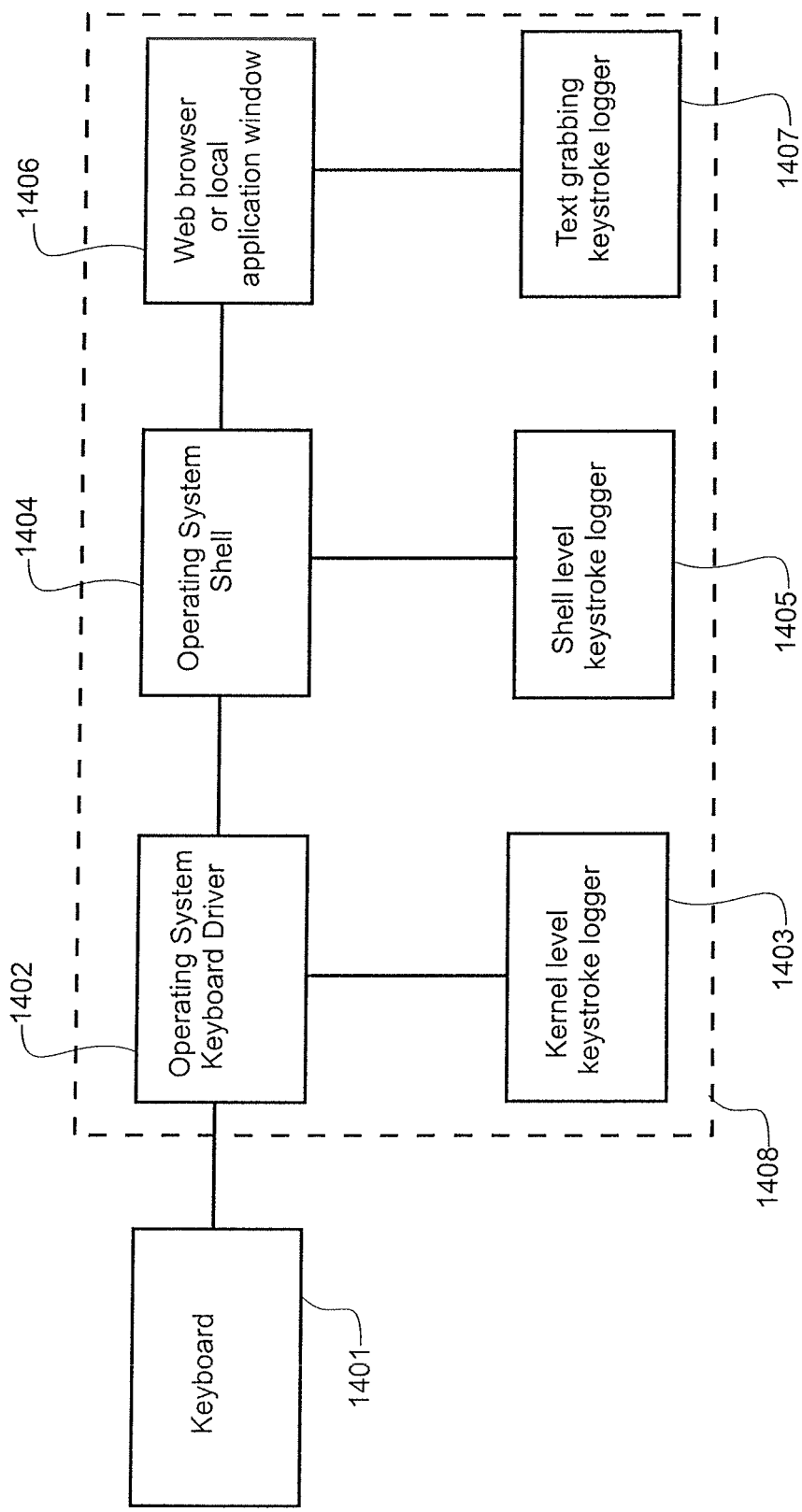
FIG. 14 is a diagrammatic representation of the different software levels at which keystroke loggers may operate.

FIG. 14 illustrates the various operating system levels where keystroke logging software is known to attack in a typical present day personal computer system. The user will enter sensitive information on a keyboard (or key-entry device) 1401 which is connected to a computer (or other hardware) 1408. The operating system of the computer will have a keyboard driver and buffer 1402 that interfaces between the hardware computer keyboard and any software. A kernel level keystroke logging program 1403 will harvest keystroke information directly from the keyboard driver.

Shell level software 1404 typically interfaces between the keyboard driver of the operating system and other higher level software applications. Shell level software typically accesses the operating system keyboard buffer to acquire keystroke information. Shell level keystroke logging software 605 may harvest information straight from the operating system keyboard buffer.

Application level keystroke logging software 1407 may further harvest keystroke information directly from an application 1406. Applications are typically used to display the information to the user via a graphical user interface.

The program according to a first aspect of the present invention is intended to defeat keystroke loggers that attempt to harvest keystroke information at a kernel level.

The program according to a second aspect of the present invention is intended to defeat keystroke loggers that attempt to harvest keystroke information at a shell level.

The program according to a third aspect of the present invention is intended to defeat keystroke loggers that attempt to harvest keystroke information through text grabbing at an application level.

The purpose of the present invention is to prevent or minimise keystroke logging by overcoming the various methods used to obtain the keystroke information, or as many of these methods as possible.

Some keystroke loggers attempt to harvest keystrokes through modification or replacement of the operating system keyboard driver. The keyboard driver is a kernel level computer program designed to interface between the computer keyboard and operating system keyboard buffer. The operating system keyboard buffer acts as temporary storage for the keystroke information before passing it on to applications that require the keystroke information as directed by the operating system. When a user enters characters from the keyboard the keyboard driver ensures that data representing these keystrokes enter the keyboard buffer.

A keystroke logger may overwrite the standard keyboard driver with a malicious version. The new version gives the keystroke logger the capability of directly harvesting keystroke information before that data reaches the keyboard buffer. An existing keyboard driver could also be modified to copy keystroke information to keystroke logging software. A keystroke logger may alternatively insert a filter on the output of the keyboard driver to harvest keystrokes. The filter forwards information from the keyboard driver to the keystroke logger. A keystroke logger either stores the keystrokes for later retrieval, in a file on the system, or is configured to send the file over a communications network to a location outside the system.

The software according to one aspect of the present invention acts as a driver filter to the keyboard driver. The software interfaces directly with operating system keyboard driver to protect all incoming keystroke information. The protection is formed by filtering out the real keystrokes and replacing them with fake, randomly-generated keystrokes. The software then interacts directly between the keyboard driver and any other software. In this way, the software has the ability to control the release of keystroke information.

Upon activation the software performs two operating system keyboard driver integrity checks. The first check confirms that the existing keyboard driver is of legitimate and original form. The software preferably verifies the digital signature of the keyboard driver. The digital signature associates the keyboard driver with its original entity. The operating system may provide functionality for verifying that a system driver matches it's digital signature (for example, under Microsoft WINDOWS, the API: WinVerifyTrust). If the digital signature of the keyboard driver is successfully verified the program moves on. If the digital signature check fails, the software prompts the user to reinstall the keyboard driver and reboot the system.

The second check to verify keyboard driver integrity is a checksum or hash operation. A checksum operation calculates a digit that represents the legitimate keyboard driver. The digit is calculated by adding up the total amount of bytes that comprise the driver software. If this digit changes, or if the hash changes then the keyboard driver has been changed or modified. While the software is activated it periodically performs a checksum or hash operation on the keyboard driver. The value of the very first checksum or hash operation output is stored in the operating system registry. If the output of any subsequent checksum or hash operation does not match the stored value then the keyboard driver has been modified or replaced. The software subsequently alerts the user via a pop-up window and prompts them to reboot the system.

The preferred software attempts to have exclusive control of the keyboard driver to prevent keystroke loggers from directly harvesting information. Exclusive control is ensured by being the first program that interfaces with the keyboard driver. The operating system may have a list of keyboard filter drivers stored in the system registry. The order of this list determines the loading priority of each listed driver. The preferred software checks this list upon activation. If the software filter driver according to the present invention is not at the top of the list, the order of the list is changed by the software to ensure that the software filter driver is loaded before other filter drivers. If a keystroke logging program was earlier in the driver priority list it may harvest keystrokes and mask itself from detection.

The software of the present invention is preferably designed to remain at the top of the driver priority list while it is activated and periodically verifies this is the case. If at any time another program gains priority over the keyboard driver filter the software alerts the user via a pop-up window and prompts them to reboot the system. Upon reboot the software replaces itself at the top of the driver priority list.

The software program reads the keystrokes from the keyboard driver and encrypts each character. The program stores the encrypted characters at a chosen unprotected RAM address. The preferred method of encryption uses the one-time pad technique. The encryption is performed so other programs that may read from the particular RAM address are subsequently unable to decipher the real data.

The software preferably also provides fake data to the keyboard buffer. The program generates a random character by generating a random number within a predetermined range and translating the random number to a character code. The software sends this random character to the operating system keyboard buffer in place of the real character.

The software according to the first aspect of this invention is dependant on the user having administrative rights to the operating system. Administrative rights give permission for software to be installed, and changes to be made to the system parameters of the operating system without administrative rights. Digital signature, checksum and hash checks are still able to be performed by any program. The software is therefore capable of alerting them to any keyboard driver related changes that have occurred.

Figure 9:
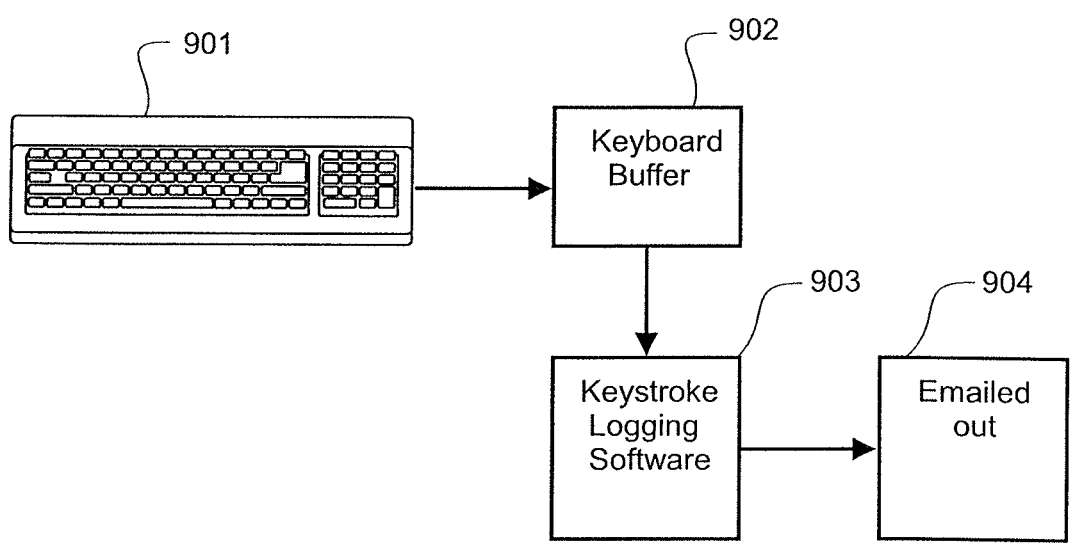
FIG. 9 is a diagrammatic representation of a system by which keystroke logging software harvests keystrokes by monitoring the keyboard buffer.

Some keystroke loggers attempt to harvest keystrokes by monitoring the keyboard buffer. These Keystroke loggers operate at an operating system shell implementation level. FIG. 9 shows a typical prior art keystroke logger of this type. The user enters characters from the keyboard 901. The keyboard driver ensures that data representing these keystrokes enter the keyboard buffer 902. The keyboard buffer acts as temporary storage for the keystrokes. Keystroke logging software 903 monitors the keyboard buffer, picking up the keystrokes entered by the user, storing this data either in memory or in a file. The keystroke logger either stores the keystrokes for later retrieval in a file on the system, or is configured to send the file via email to a pre-configured address outside the system 904.

The software according to a second aspect of the present invention works by sending fake randomly-generated characters to the keyboard buffer.

Figure 10:
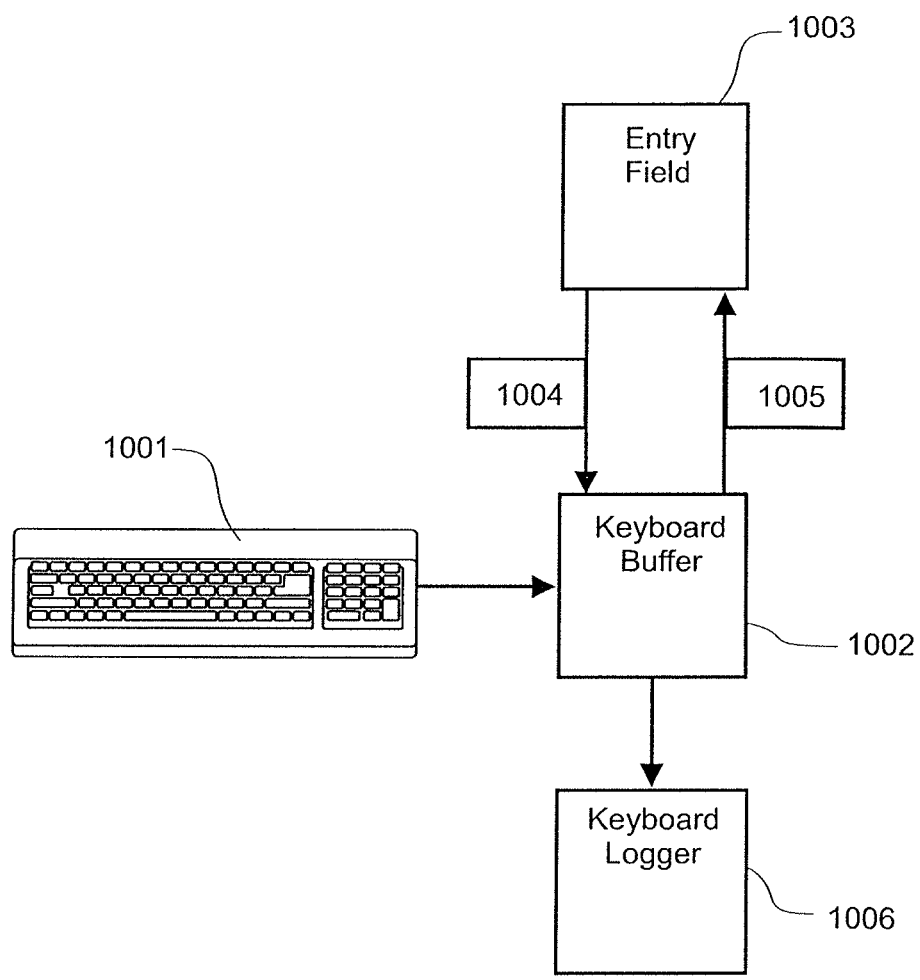
FIG. 10 is a diagrammatic representation of one aspect of the present invention which prevents keystroke loggers harvesting sensitive keystrokes by monitoring the keyboard buffer.

The keystroke logger reads all the characters from the keyboard buffer and cannot distinguish between the randomly-generated characters and those actually entered by the user. FIG. 10 illustrates this aspect of the present invention. When the field protected by the present invention has focus, the software at 1003 generates a stream of random characters and sends these characters to the keyboard buffer at 1004. For example with the Microsoft Windows operating system the "keybd_event" command can be used to send a character code to the keyboard buffer.

The software generates a random character by generating a random number within a predetermined range and translating the random number to a character code. The character code is of a type that is a parameter for example for the keybd_event API. For example the character code "VK_A" represents an event associated with the "a" key. The keybd_event API selectively generates either a key-down event or a key-up event. Accordingly to represent a single key press the keybd_event command is executed once using the parameters for the particular key and indicating a key-down event and a further time with the parameter indicating the key and the parameter indicating a key-up event. To ensure a full mix of obscuring characters the software may generate simulated key presses of characters and numerals each character or numeral key press may be bracketed by a simulated press of the "shift" key to simulate an upper case character for non-excluded symbol. The random number may be generated using, for example, the Microsoft WINDOWS Crypto API.

As the user enters characters from the keyboard 1001, these also enter the keyboard buffer. If a keystroke logger 1006 is present it harvests all of the characters from the keystroke buffer. The keystroke logger cannot distinguish between characters sent to the keyboard buffer 1002 from the keyboard 1001, and those sent from the software 1003 implementing the present invention.

In the preferred system, the characters sent by software 1003 are streamed at random intervals. The software secures second string of random numbers in order to determine the interval. Each time interval may be for example randomly selected between 0.05 seconds and 0.5 seconds. The time interval indicates a delay between executing the relevant "keybd_event" commands. Preferably, the software executes the commands in pairs initiating the respective key-down and key-up events and includes a very short random interval between these events. This prevents a keystroke logger identifying characters originating from the keyboard by analysing the time intervals between keystrokes.

The stream of random characters generated by software 1003 is generated and stored securely by the software to prevent a keystroke logger identifying the fake characters by analysing the stored memory of software 1003.

After the software randomly executes a generated key-down event, the software waits until an acknowledgement from the keyboard buffer is received before sending the succeeding key-up event. This prevents losing keystroke information in the event of an overloaded keyboard buffer.

In order for the software 1003 to determine the characters originating from the keyboard 1001, it reads all the characters on the keyboard buffer as indicated by arrow 1005, and then removes the characters sent by the software 1004. Those characters remaining have originated from the keyboard 1001. The software 1003 may perform this analysis, for example, once focus passes from the protected entry field or on an ongoing basis. Preferably the software receives a continuous flow of data from the keyboard buffer and the flow of data is processed as it is received. As soon as either the user enters a keystroke or the software generates a false keystroke the new data in the buffer is read by the software. The software processes the new data to determine if it corresponds with the next unmatched character in the false data sequence. If the software determines that the data is not false data then it is recorded as a user entry. The protected entry field preferably displays a series of asterisks or other non-descript characters so as not to confuse the computer user.

In accordance with a further aspect of the invention this extracted data is supplied directly to the underlying application, not to the data entry window program.

Figure 11:
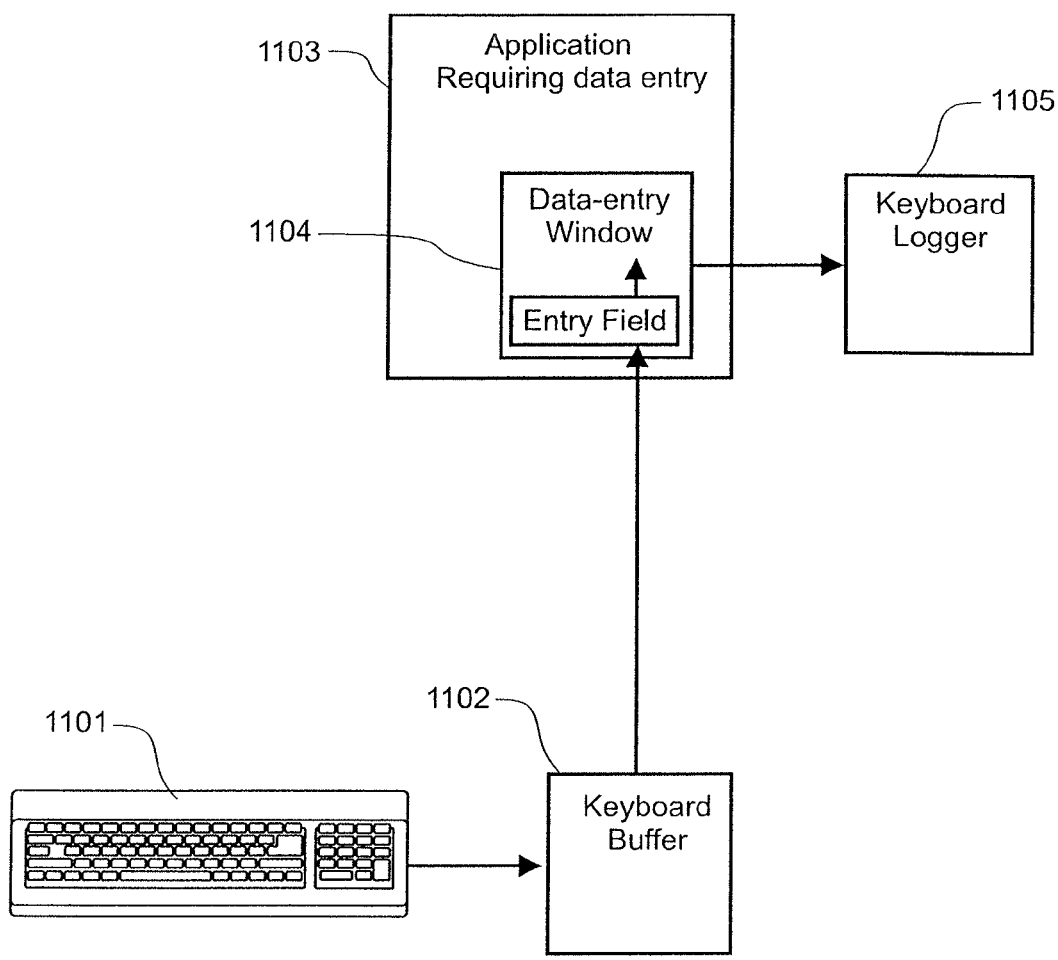
FIG. 11 is a diagrammatic representation of a system by which keystroke logging software harvests keystrokes by accessing the data entry window.

FIG. 11 illustrates a keystroke logger that harvests keystrokes from the data-entry window. The user enters data at the keyboard 101. This data enters the keyboard buffer 1102. The entry field 1103 reads data from the buffer 1102 and sends the data to the window 1104. The keystroke logger 1105 monitors the data in memory associated with the data-entry window.

The protection software according to this aspect of the invention prevents keystroke loggers harvesting keyboard entry data from the data entry window memory by sending the data entry window false data, while providing the true entered data directly to the underlying application.

Figure 12:
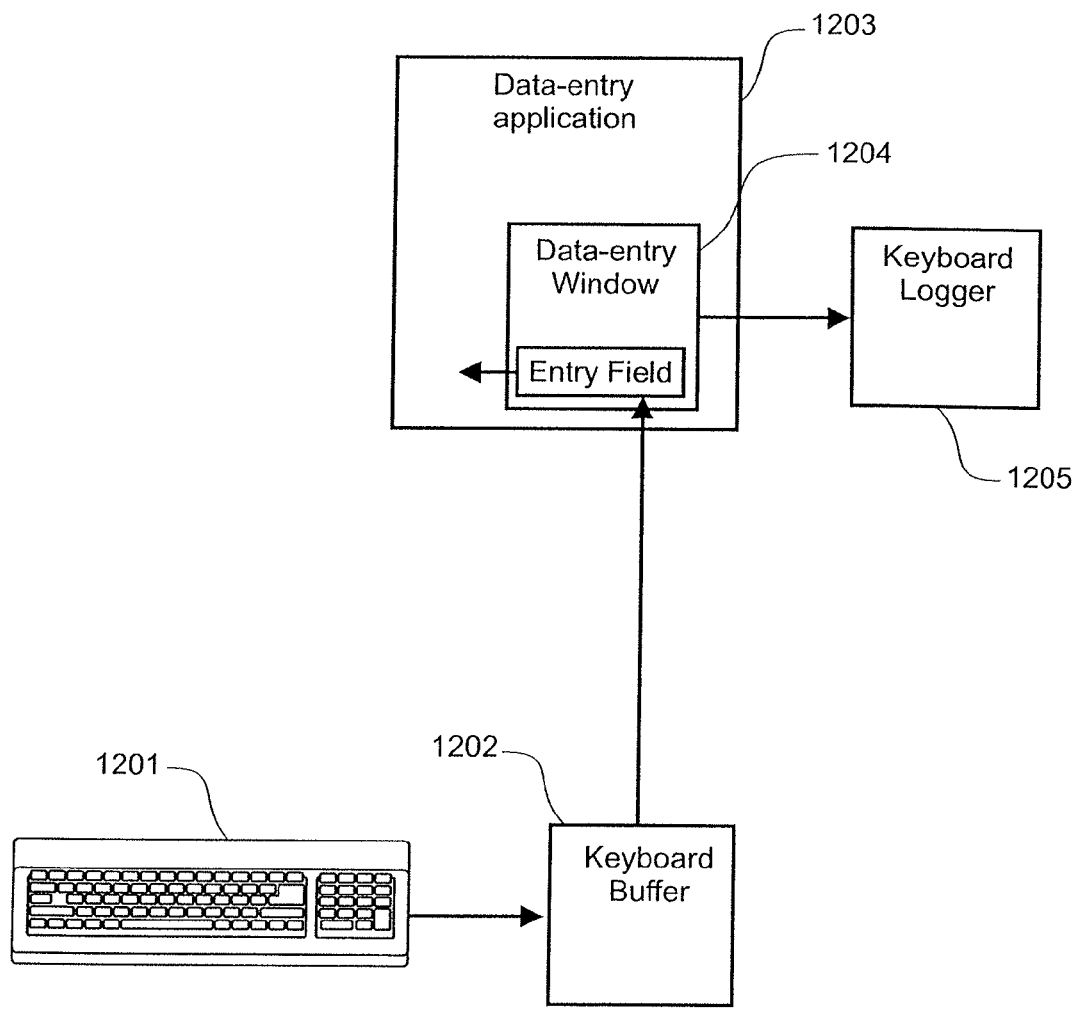
FIG. 12 is a diagrammatic representation of a further aspect of the present invention which prevents external software from accessing sensitive data from the data entry window by altering the characters held by the data entry window to randomly-generated characters.

FIG. 12 illustrates this aspect of the invention. The user enters characters at the keyboard 1201. These characters enter the keyboard buffer 1202. Once these characters are extracted by the modified entry field comprising the present invention 1203, the entry field generates random characters and sends these random characters to the data-entry window 1204. The present invention stores the actual characters entered by the user in secure memory in order that they can be processed by the underlying application software. When the application processes the data, it accesses the data securely stored by the modified entry field, not the data from the data-entry window. A keystroke logger 1205 harvesting characters from the data-entry window receives the randomly generated characters and not the actual characters entered at the keyboard.

For this aspect of the present invention it is important that the protected entry field supplies the unmasked user input data to the underlying application that is authorised to receive it and not to any other application which might for example be a keyboard logger. Preferably the protected entry field software element supplies the collected user input data on request from the underlying application, and the request from the underlying application is uniquely identifiable as an authorised request. In the preferred embodiment of the present invention the protected entry field supplies a randomly generated token to the underlying application that has initialised the entry field. The entry field software element reviews any request for user input data for the presence of this token, or for proof that the application making the request was the receiver of this token. The request may include the token or a derivation of the token. The protected entry field only supplies the user input data in reply to the request if the request includes the proof that the requesting application holds the token. Otherwise the preferred protected field shuts down and alerts the user to the possibility of infiltration of their system, for example by displaying a suitable message. By shutting down we mean the entry field subsequently refuses to supply user entry data, and in particular does not proceed to extract user entry data from contaminated user entry data in the case that the software includes both aspects of the present invention, such as illustrated in FIG. 5.

Preferably the protected entry field supplies the identifying token to the underlying application at the time of its initialisation. In particular preferably the initialising application requests a token from the entry field at the time of initialisation and the entry field generates a random token and supplies it in response to this request. If the entry field subsequently receives a further request for an identifying token the entry field preferably responds to this further request by shutting down and providing an alert to a user of the computer of the possible presence of an infiltrating program on their system.

Randomly generating a token may for example comprise generating a random number using the Microsoft WINDOWS Crypto API. Essentially the token is a data string of a length selected to afford suitable security.

The software according to this aspect of the invention prevents any application other than the authorised host application from accessing data entered into the modified entry field.

For non-password fields it is necessary for the user to be able to see the information they have entered into the system. For example, such fields may be credit card number or bank account fields. It is therefore not feasible to obscure the keystroke information from the window in the aforementioned manner.

In the Microsoft WINDOWS operating system a window "hook" is provided by which a function can intercept events before they reach their intended application. These events can be keystrokes, mouse movements or messages. The function is subsequently capable of modifying or deleting any of these events. For example, using hooks a program can listen to all keystroke information. This is a technique commonly available to keystroke logging software.

To prevent keystroke loggers from being notified of, or being privy to keystroke information, the preferred protection software first disables all hooks in the operating system. The software then proceeds to install a master hook that monitors and filters all windows messages. The master window hook is a 'debug' hook. The debug hook is installed using the operating system API: SetWindowsHookEx. A debug hook is able to block information sent to other window hooks. Every window hook has identification pertaining to what kind of message it contains. The software of the invention uses the debug window hook to block all hooks with messages that would be of use to a keystroke logger. This prevents any other program from interfering with the information that is sent to or from a protected entry field.

The debug window hook is enabled whenever a protected input field has focus. The debug window hook is removed when the protected field loses focus again. Creating the debug window hook each time a protected input field has focus enables it to remain the master hook in the operating system.

When an application window such as a credit card field calls for keystroke information from the keyboard buffer, the master window hook installed by the software will then receive the request and allow the application window to gather the information.

When a protected field has focus and the user enters keystroke information the keyboard buffer will then request that that keystroke information be sent to the application window. The master debug window hook will receive this request and verifies the message has been sent from the underlying application. The message will then be permitted to pass to the application window. This allows the keystroke information to be visible to the user. At the same time the master window hook blocks any other requests that may interfere or log the information communicated between the keyboard buffer and application field.

The preferred software for the Microsoft WINDOWS operating system also implements some API disabling to specifically prevent keystroke loggers from using them to obtain field information. The GetWindowText and GetWindowTextEx APIs are changed from default behaviour. When these APIs are modified by the software the APIs return randomly generated fake characters in place of the real characters from the protected fields. Therefore a keystroke logger would log incorrect information if it uses either of these APIs. Other API's and events that are disabled include commands that allow keystroke loggers to capture screens.

The software also preferably goes some way toward detecting hardware keystroke loggers. Hardware keystroke loggers physically connect between the keyboard output and the socket on the computer. The USB controller of a computer knows of all the devices that are connected to the USB bus. If the computer keyboard interfaces using the USB protocol then the USB bus will include this in a list of devices. If a hardware keystroke logger is present on the physical output of a USB keyboard, the USB controller may recognise this device as separate from the keyboard. The keystroke logger should then appear in the list of devices connected to the USB bus. The preferred software upon activation scans this list for foreign devices that are possibly keystroke loggers. If the software detects a foreign device it will alert the user. The user is then able to physically investigate the existence of any unwanted devices connected to their computer keyboard.

Figure 13:
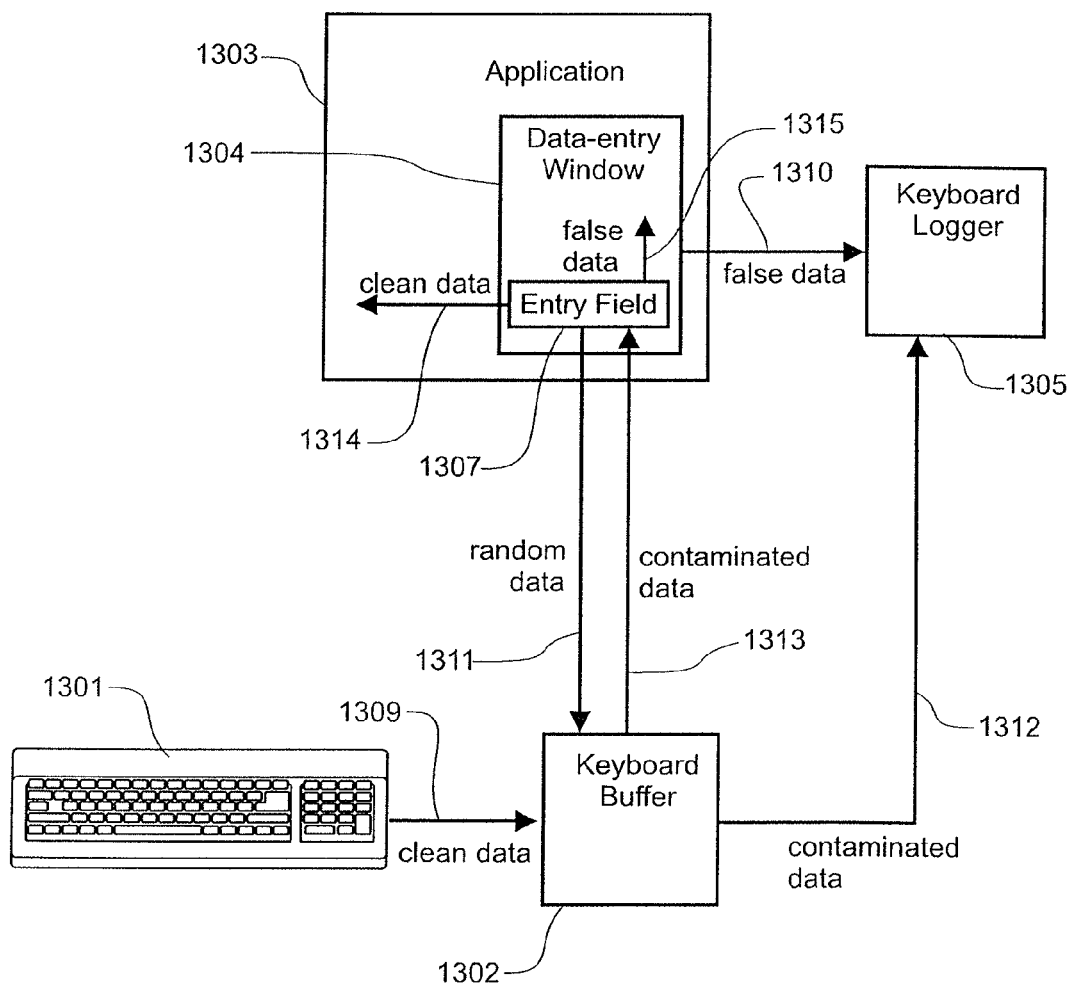
FIG. 13 is a diagrammatic representation of both aspects of the present invention working together to protect sensitive keystroke data.

The software preferably implements several aspects of the invention at once. An example is illustrated in the diagram of FIG. 13.

The underlying application 1303 requires data from a user. The user will enter the data via keyboard 1301. The data from keyboard 1301 enters keyboard buffer 1302. Unknown to the user of keyboard 1301 a keyboard logger 1305 is present in the system. The application 1303 launches a data entry window 1304 to gather data from the user. The data entry window 1304 includes a protected entry field 1307 operating in accordance with both aspects of the present invention. When the entry field 1307 is initialised, application 1303 requests a token. The entry field 1307 generates a token and returns it to application 1303.

When the entry field 1307 gains focus, indicating that the user of keyboard 1301 intends to enter data into the entry field 1307, the entry field begins to stream random data 1311 to the keyboard buffer 1302. The user of keyboard 1301 enters data at keyboard 1301 and this clean data 1309 enters keyboard buffer 1302. The content of the keyboard buffer 1302 is read by entry field 1307 and may also be being read by a keystroke logger 1305. The entry field 1307 receives contaminated data 1313. The keystroke logger 1305 also receives contaminated data 1312.

The entry field 1307 generated and stored the random data stream 1311 which has contaminated the clean data 1309. The entry field 1307 removes the random data from the contaminated data 1313 that it receives from the buffer to leave clean data. Once the focus leaves the secured entry field the entry field stops streaming data to the keyboard buffer. The application 1303 may request the entered data by sending a request accompanied by the token to the entry field. Clean data 1314 is supplied direct to the application 1303 in response to the authenticated request. False data 1315 is supplied to the data entry window 1304. The keystroke logger 1305 may extract the false data from the data entry window as indicated by arrow 1310.

Accordingly the secured entry field 1307 of the present invention defeats two of the methods by which a keystroke logger 1305 may attempt to extract sensitive information entered by the user of keyboard 1301 while still allowing a user to supply the sensitive information to the application 503 in the usual manner. The system is essentially transparent to the user.

Further embodiments allow the software to implement the additional aspects of this invention simultaneously for both password and non-password fields.

There are various ways the software can execute on a computer system, for example, as a stand-alone software application, as part of the web browser process (such as a plug-in, extension, help object, or control of the browser), embedded within an application or as part of the computer operating system.

There are also various ways in which the software can be placed in the computer system environment, for example, downloaded from a web site, installed on the computer system or executed from an external device such as a CD-ROM or flash disk.

There are four preferred options for loading the software of the present onto a user's local computer.

The first preferred option may be used when a user loads a webpage where the entry of sensitive information is required. The webpage checks to see if the software has been preinstalled. The webpage for example may be part of an internet banking website. If the software is not already installed on the local computer the user is prompted to download and install the software. The software is not required to be downloaded again once installation has occurred. The source code defining the webpage where sensitive information is required can also contain an activation code, or the software will detect a password field. The installed software is activated when it detects an activation code contained source code of a webpage. The installed software is also activated when a password field is detected. The software is also activated by a non-password field that requires protection. The software activates the anti keystroke logging techniques when a protected field on the webpage has focus.

In the second preferred option, the software forms part of a local application running on the local device. For example the software is incorporated within a local application such as internet browsing software. When a protected field on a webpage, indicated by an activation code in the page source, has focus the software will then activate the anti keystroke logging techniques. Alternatively the software is permanently activated and does not rely on activation codes contained in the webpage.

In the third preferred option, the software is loaded from a local device such as from the personal computer hard drive, CD-ROM, or portable memory stick. Once loaded, the software can detect when an internet browsing application has been executed. The software detects when a protected field has focus on the internet browsing application. The software is then able to implement the various anti keystroke logging techniques.

In the forth preferred option, the software is embedded as part of a local application. The software is activated when the local application is executed. The software can protect data-entry fields within the application, or alternatively data-entry fields external to the application or on web-based applications.

While this anti-keystroke logging software has been developed using the Microsoft Windows operating system on a personal computer, the software employs concepts that are extendable to other devices and operating systems. Devices such as cellular phones and PDA's all have a form of keyboard buffer that functions in a similar way to a common computer. Thus the buffer streaming technique is able to be implemented.

Other devices also have keyboard or keypad drivers and data-entry windows and/or fields, allowing key entry to be replaced with fake characters. The techniques described in this document can therefore be applied to sensitive data fields on a range of hardware devices.

Figure 15:
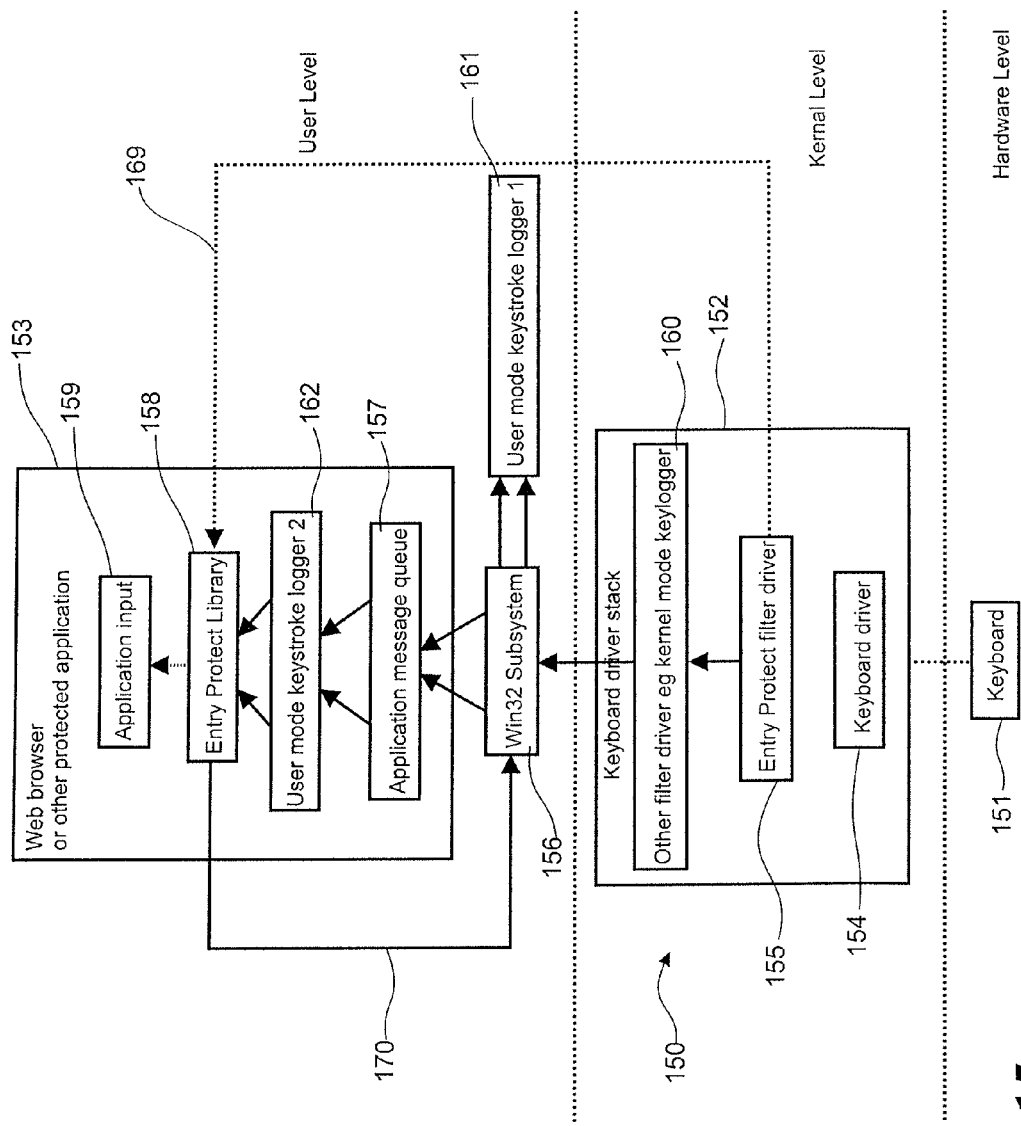
FIG. 15 is a diagrammatic representation of the software structure showing a further embodiment of the invention for circumventing keylogger programs using kernel level keystroke replacement and/or random keystroke replacement.

A further aspect of this invention will be described with reference to FIG. 15. This involves kernel level replacement/conversion of keystrokes. In this embodiment, each keyboard keystroke output is replaced with a random keystroke that is passed up a driver stack to the Win32 subsystem (or other window manager) in place of the real stroke received from the keyboard. An application/browser library receives the random keystroke stream but also receives the real keystrokes via another channel.

Operation of this embodiment will be described in more detail with reference to FIG. 15. FIG. 15 shows a computer system 150 comprising a keyboard 151 that interacts with hardware operating a kernel including a keyboard driver stack 152. This communicates with a web browser or local application 153 as described previously. The keyboard driver stack comprises a keyboard driver 154 and filter driver 155. A keyboard is connected to the keyboard driver in the keyboard driver stack. The output from the filter driver is passed to the Win32 subsystem 156 or other window manager. A web browser or application 153 runs on the window manager. It comprises an application message-queue 157 (for among other things receiving a keystroke stream), and protection library 158, and an application input window 159 or similar. Keystrokes are passed from the keyboard, through the keyboard driver to the filter driver, which in turn passes keystrokes to the window manager and on to the application's input window and library via an application message queue.

The filter driver 155 receives input from key presses from the keyboard 151 and can generate keystrokes for passing to a keyboard buffer portion. In such an arrangement, a Trojan keystroke logger could exist. The logger could be a kernel level logger, e.g. 160, which extracts or harvests keystrokes from the filter driver/kernel messages. Alternatively, it could be a user level keystroke logger, e.g. 161, that harvests keystrokes from window messages, or alternatively a text grabbing keystroke logger, e.g. 162, that harvests keystrokes from the web browser or local application input fields.

The present embodiment is arranged to prevent any such keystroke logger from successfully harvesting keyboard output. To do so, the filter driver 155 receives the keystrokes, and randomly converts them to different keystrokes. These random keystrokes are passed to the window manager 156 and onwards to the application 153. Any keylogger will only harvest random keystrokes that bear no relation to the actual keystrokes input by the user. The actual keystrokes made by the user are stored in memory by the filter driver 155. The protection library 158 requests these from the filter driver and uses these keystrokes in place of the random keystrokes received from the window manager.

Figure 16:
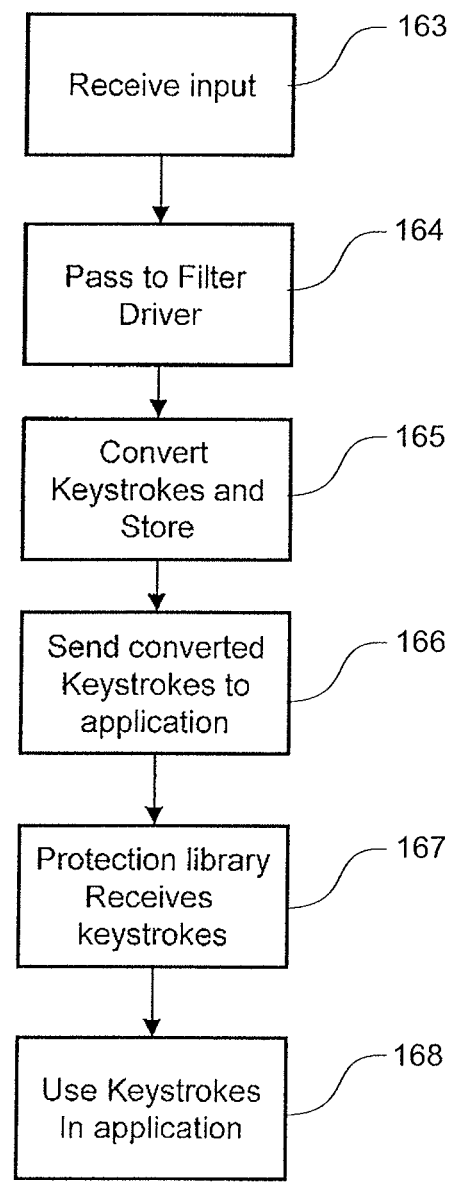
FIG. 16 is a flow chart of a method for circumventing keylogger programs by kernel keystroke replacement.

Operation of this embodiment of the invention will now be described with reference to FIG. 16. A user enters keystrokes into the keyboard, step 163, and this is passed to the keyboard driver. The keyboard driver receives input and passes this to the filter driver, step 164. The filter driver randomly converts each received keystroke into another keystroke, step 165. The original keystroke is stored in memory by the filter, step 165, which can be optionally stored in encrypted form to provide an extra layer of security. The randomly replaced keystroke is then passed further up the keyboard driver stack, to the message queue of the protected application, step 166. The protection library receives the random keystrokes and also retrieves the original keyboard input from the memory/filter, step 167 and utilises these. It sends the original keystrokes on to the application input for use, step 168. The library might also query the filter driver to cross-correlate the memory keystrokes with the random receive keystrokes to ensure they match to verify the actual keystrokes are correct. The random keystroke stream from the filter driver is ignored. However, a keystroke logger will simply log the output from the keyboard filter driver. This will be useless as the data stream is garbage and the keylogger will be unaware of this.

As an example, the process might do the following: the user inputs the key sequence 'a' down, 'a' up, 'b' down, 'b' up, 'c' down, 'c' up. When the keystrokes 'a' down, 'a' up are received from the keyboard driver, the software filter converts them randomly to the keystrokes 'x' down, 'x' up and passes them up the keyboard driver stack. The software filter then receives the keystrokes 'b' down, 'b' up from the keyboard driver, and randomly replaces them or converts them to the keystrokes 'y' down, 'y' up and passes them up the filter driver stack. Then the software filter receives the final keystrokes 'c' down, 'c' up and randomly replaces them with the keystrokes 'z' down, 'z' up and passes them up the keyboard driver stack. As a result of this, the keystrokes 'a' down, 'a' up, 'b' down, 'b' up, 'c' down, 'c' up which are entered in sequence by the keyboard are converted into the keystrokes 'x' down, 'x' up, 'y' down, 'y' up, 'z' down, 'z' up. Any keystroke logger would harvest this keystroke steam, which would bear no relation to the actual input 'a' down, 'a' up, 'b' down, 'b' up, 'c' down, 'c' up.

For the remainder of the genuine software to work correctly, the original keystroke sequence "abc" must be re-generated. In a preferred embodiment, the protection library receives this key sequence from the filter driver which in turn requests it from memory, rather than from the converted keystroke stream, which contains random characters. In alternative embodiments, the memory may instead contain information from which the original key sequence could be derived either alone or from data received from the keyboard buffer. For example, the driver might have a conversion algorithm to convert the remaining characters xyz back to the original letters "abc". Yet other alternatives for recreating the original sequence can also be envisaged by those skilled in the art.

A further aspect of this invention will be described also with reference to FIG. 15. This involves kernel level replacement/conversion of keystrokes. In this embodiment, each keyboard keystroke output is replaced with a random keystroke that is passed up a driver stack 152 to the Win32 subsystem (or other window manager) 156 in place of the real stroke received from the keyboard 151. The application/ browser library 158 receives the random keystroke stream but also receives the real keystrokes via another channel 169. In addition, random keystrokes are periodically created by the application library 158 and passed to the message queue (via the window manager 156) via another channel 170 and interspersed amongst the converted keystrokes. This creates a stream of keystrokes that are passed up, each of the keystrokes in the stream either being a random replacement for an actual keystroke received from the keyboard or simply a randomly inserted keystroke. Information indicating the nature of the actual keystrokes received from the keyboard is stored in memory by the filter driver 154. This stored data can then be used to construct the original keyboard input.

The purpose of producing the stream of data comprising the two components of replacement random keystrokes plus a stream of additional random keystrokes is to increase security:

With a system comprising only the replacement random keystroke component, a keylogger might determine the number of keystrokes entered by the user. The addition of a random stream of keystrokes conceals the number of real keystrokes entered by the user.

With a system comprising only the introduction of the stream of random keystrokes, the real keystrokes would be interspersed within the stream. After a certain number of iterations of the user entering the same password, it is possible for malware to identify the real keystrokes if they are interspersed within the stream. Adding the component of replacing the real characters with random keystrokes, prevents this, thus improving security.

Operation of this embodiment will be described in more detail with reference to FIG. 15. FIG. 15 shows a computer system comprising a keyboard 151 that interacts with hardware operating a kernel including a keyboard driver stack 152. This communicates with a web browser or local application 153 as described previously. The keyboard driver stack comprises a keyboard driver 154 and filter driver 155. The keyboard is connected to the keyboard driver in the keyboard driver stack. The output from the filter driver is passed to the Win32 subsystem 156 or other window manager. A web browser or application 153 runs on the window manager 156. It comprises an application message queue 157 for among other things receiving a keystroke stream, and protection library, and an application-input window or similar. Keystrokes are passed from the keyboard, through the keyboard driver to the filter driver, which in turn passes keystrokes to the window manager and on to the application's input window 159 and library 158 via the application message queue 157.

In such an arrangement, a Trojan keystroke logger could exist. The logger could be a kernel level logger, e.g. 160, which extracts or harvests keystrokes from the filter driver/ kernel messages. Alternatively, it could be a user level keystroke logger, e.g. 161, that harvests keystrokes from window messages, or alternatively a text grabbing keystroke logger, e.g. 162, that harvests keystrokes from the web browser or local application input fields.

The present embodiment is arranged to prevent any such keystroke logger from successfully harvesting keyboard output. To do so, the operating system keyboard driver further comprises a filter driver 155 that sits between the keyboard driver and other software filters. This filter driver receives keystrokes from the driver relating to keyboard input. It then generates replacement random keystrokes for passing up the keyboard driver stack, and the protection library also generates additional random keystrokes for periodically inserting 170 into the Win32 Subsystem 156 to provide the stream. In this embodiment, the filter driver also stores data in memory, which indicates the nature of the real input from the keyboard. The web browser or protected local application 153 comprises the protection library 158 that can receive this data from the filter driver, rather than from the usual application message queue, such that it can receive the correct information from the keyboard output.

If a kernel level keystroke logger exists, it exists higher in the keyboard stack than the filter driver, which it will assume provides the correct keyboard output. It will simply however receive random keystrokes that bears no relation to the keyboard output and therefore cannot be used for nefarious purposes.

Figure 17:
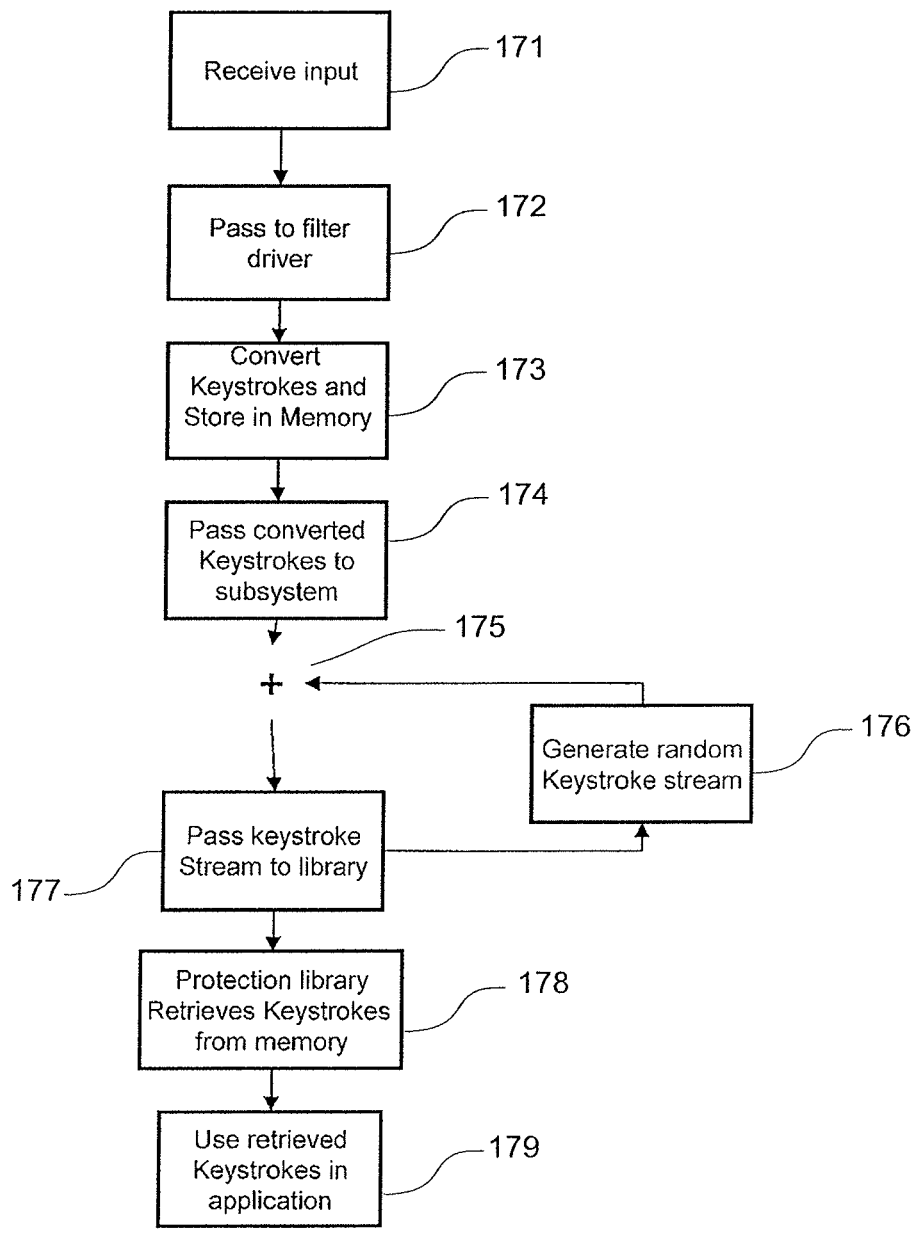
FIG. 17 is a flow chart of a method for circumventing keylogger programs by kernel level keystroke replacement and random keystroke generation.

Operation of this embodiment of the invention will now be described with reference to FIG. 17. A user enters keystrokes into the keyboard, step 171, and this is passed to the operating system keyboard driver. The keyboard driver receives input and passes this to the filter driver, step 172. The filter driver randomly converts each received keystroke into another keystroke, step 173. The original keystroke is stored in memory, step 173, which can be optionally stored in encrypted form to provide an extra layer of security. The randomly replaced keystroke is then passed further up the keyboard driver stack, ultimately to the message queue of the protected application, step 174. Prior to that, periodically, an additional unrelated random "dummy" keystroke can be generated, step 176, by the protection library and presented to the Win32 Subsystem and message queue, step 175. Several such keystrokes might be passed to the message queue in any particular instance. This is all passed to the protection library en route to the application, step 177. The actual keystrokes are obtained by the protection library from the memory where they have been stored by the filter driver, step 178. These are then used by passing them to the application input 159, step 179.

As an example, the process might do the following: the user inputs the key sequence "abc". Periodically the protection library will generate a random keystroke and pass it to the Win32 Subsystem, for example the letters "jk". When the keystroke "a" is received from the keyboard driver, the software filter driver converts this randomly to the keystroke "x" and passes this up the keyboard driver stack. The protection library then randomly generates the keystroke sequence e.g. "mnop" and passes this to the Win32 Subsystem. The software filter then receives the keystroke "b" from the keyboard driver, and randomly replaces this or converts this to the keystroke "y" and passes this to up the keyboard driver stack and upwards. The keystrokes "qrs" are then randomly generated and streamed to the Win32 Subsystem, prior to the software filter receiving the final letter "c" and randomly replacing this with the keystroke z and passing it up the keyboard driver stack. Finally the keystrokes "tuv" are randomly generated and passed to the Win32 Subsystem.

As a result of this, the keystrokes "abc" which are entered in sequence by the keyboard are converted into the keystrokes "xyz" and then interspersed into the key sequence "jklmnopqrstuv" resulting in a keystroke stream being passed to the Win32 Subsystem comprising "jkxmnopyqrsztuv". Any userland keystroke logger would harvest this keystroke steam, which would bear no relation to the actual input "abc".

For the remainder of the genuine software to work correctly, the original key sequence "abc" must be re-generated. In one possible embodiment, the protection library simply receives this key sequence from the filter driver which in turn requests it from memory, rather than from the application message queue, which contains random keystrokes. In alternative embodiments, the memory may instead contain information from which the original key sequence could be derived either alone or from data received from the filter driver and/or from information in the protection library. For example, the memory might contain the keystrokes "jklmnopqrstuv" which can be removed from the stream of keystrokes from the application message queue, leaving "xyz". The driver then has a conversion algorithm to convert the remaining keystrokes xyz back to the original keystrokes "abc". Yet other alternatives for recreating the original sequence can also be envisaged by those skilled in the art.

An alternative to this invention would be to only covert the keystrokes using a function, and then regenerate the keystrokes using an inverse function. No randomly generated keystrokes would be interspersed.

In another alternative, the replacement keystrokes would be generated using a function, and then stored (encrypted or unencrypted) in memory. An inverse function would not be needed to regenerate the keystrokes. The actual keystrokes would be instead obtained from memory.

Figure 18:
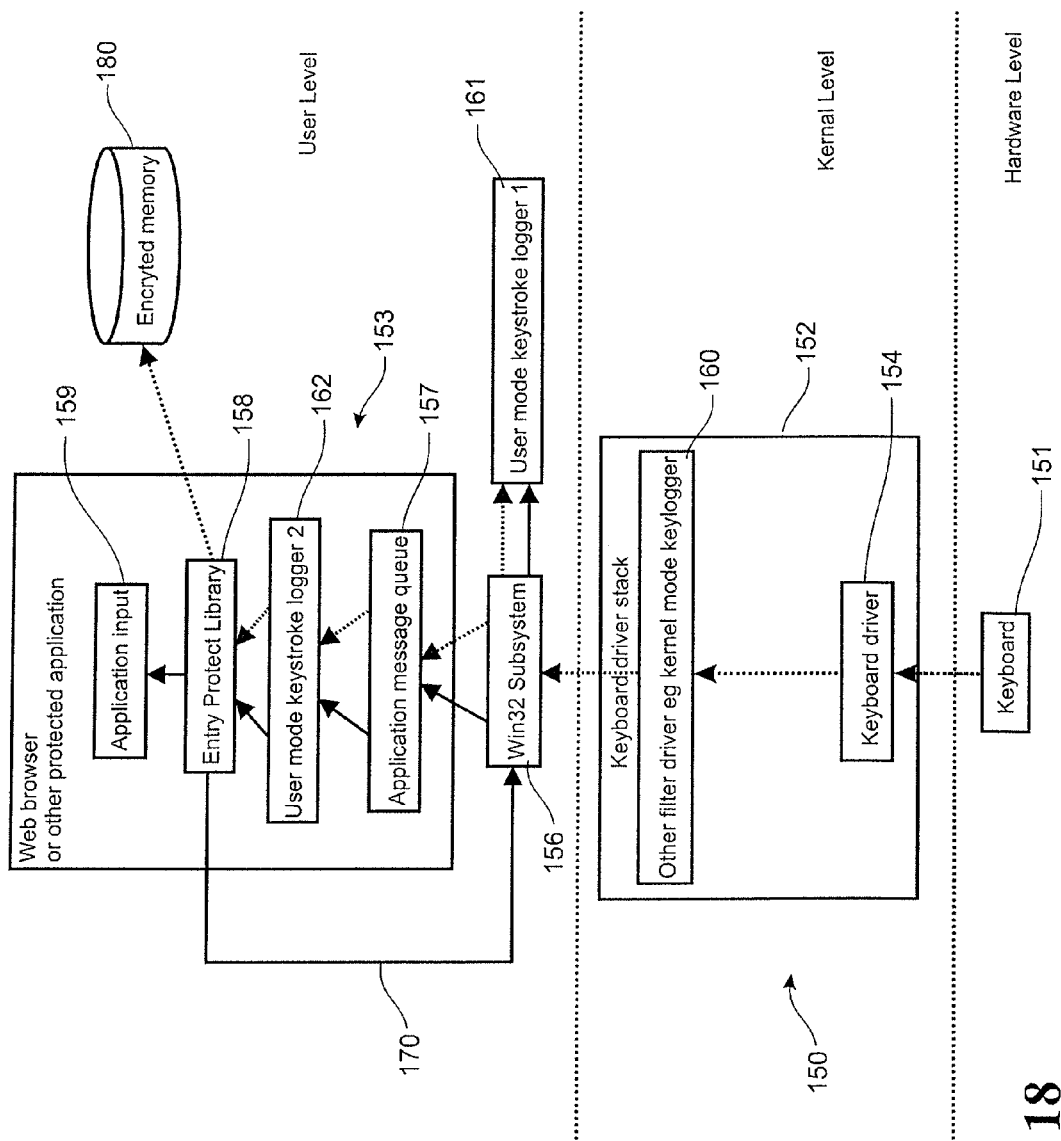
FIG. 18 is a diagrammatic representation of the software structure showing a further embodiment of the invention for circumventing keylogger programs using non-kernel keystroke replacement and/or random keystroke replacement.

A further aspect of this invention will be described with reference to FIG. 18. This involves kernel level "diversion" of keystrokes. In this embodiment, the keyboard keystroke output is passed to the keyboard driver 154, through the Win32 subsystem 156 and onto to the message queue 157 and protection library 158. Upon receiving keystroke input, the protection library encrypts and stores the input. This is then used by the application. The protection library also generates random keystrokes, which are passed to the Win32 subsystem.

Operation of this embodiment will be described in more detail with reference to FIG. 18. FIG. 18 shows a computer system 150 comprising a keyboard 151 that interacts with hardware operating a kernel comprising a keyboard driver stack 152. This communicates with a web browser or local application 153 as described previously. The keyboard driver stack comprises a keyboard driver 154. A keyboard is connected to the keyboard driver in the keyboard driver stack. The output from the keyboard driver is passed to the Win32 subsystem 156 or other window manager. The web browser or application 153 runs on the window manager 156. It comprises an application message queue 157 for among other things receiving a keystroke stream, and protection library 158, and an application input window 159 or similar.

Keystrokes are passed from the keyboard, through the keyboard driver to the window manager and on to the protection library via an application message queue. The protection library encrypts the keystrokes and stores them in the memory. The actual keystrokes are not passed to fields in the application input window (e.g. password fields). Any keystrokes destined for such fields are instead obtained from the memory. Further, the protection library generates random keystrokes and passes these to the Win32 subsystem. These random keystrokes are passed to the message queue and on to the application input fields via the protection library. These are the random keystrokes that a user level or application level keylogger sees.

The present embodiment is arranged to prevent a subsystem level keystroke logger or an application level keystroke logger from successfully harvesting keyboard output. To do so, protection library encrypts and passes the keyboard keystrokes directly to the memory, and does not pass the keystrokes to an input field (e.g. password field) in the usual manner. This prevents a keylogger harvesting from such fields. Further, as the protection library generates random keystrokes which are passed to the Win32 subsystem, these are passed on to any input fields. These random keystrokes, as opposed to the actual keystrokes, will be harvested by any subsystem level keylogger.

Figure 19:
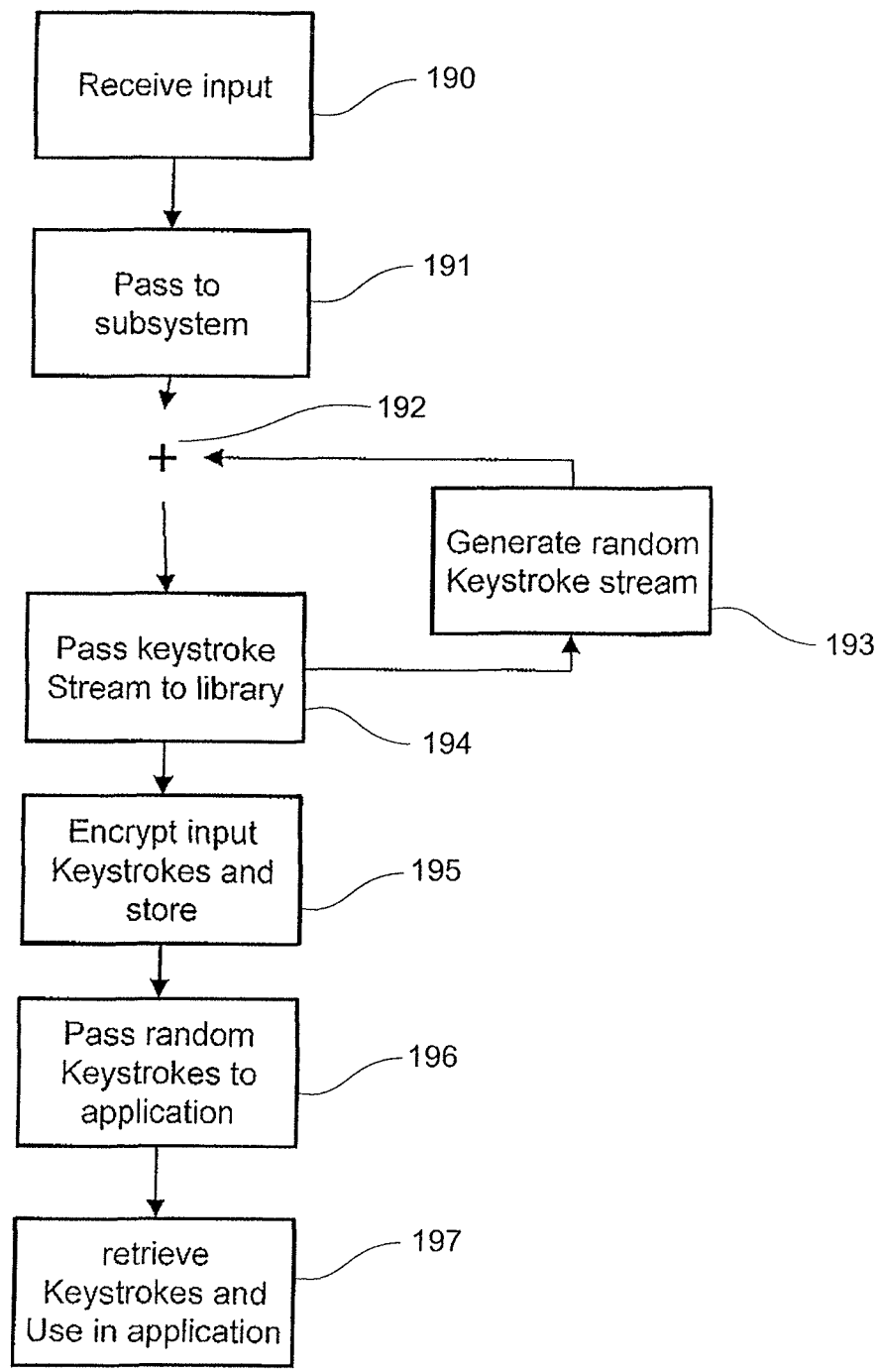
FIG. 19 is a flow chart of a method for circumventing keylogger programs by non-kernel keystroke replacement and random keystroke generation.

Operation of this embodiment of the invention will now be described with reference to FIG. 19. A user enters keystrokes into the keyboard, step 190, and this is passed to the keyboard driver and on to the protect library via the win32 subsystem, step 191, and application message queue. The protection library encrypts the actual keystrokes and diverts them for storage in memory, step 195. In parallel, random keystrokes are generated by the protection library and passed to the window manager, steps 193 and 192 where they are added to the stream of actual keystrokes received by the library 158, step 194. The random keystrokes are received at the application input from the window manager via the message queue. The actual keystrokes to be used by the application/browser are retrieved from the memory and decrypted for use, step 197.

As an example, the process might do the following: the user inputs the key sequence 'a' down, 'a' up, 'b' down, 'b' up, 'c' down, 'c' up. These are received by the protection library, encrypted and stored in memory. The protection library the generates the stream "jklmnopqrstuv" and sends this to the subsystem, which is received by the application input. This is ignored by the application/browser, which receives the encrypted "abc" keystroke input, decrypts the keystrokes and uses the decrypted form.

Figure 20:
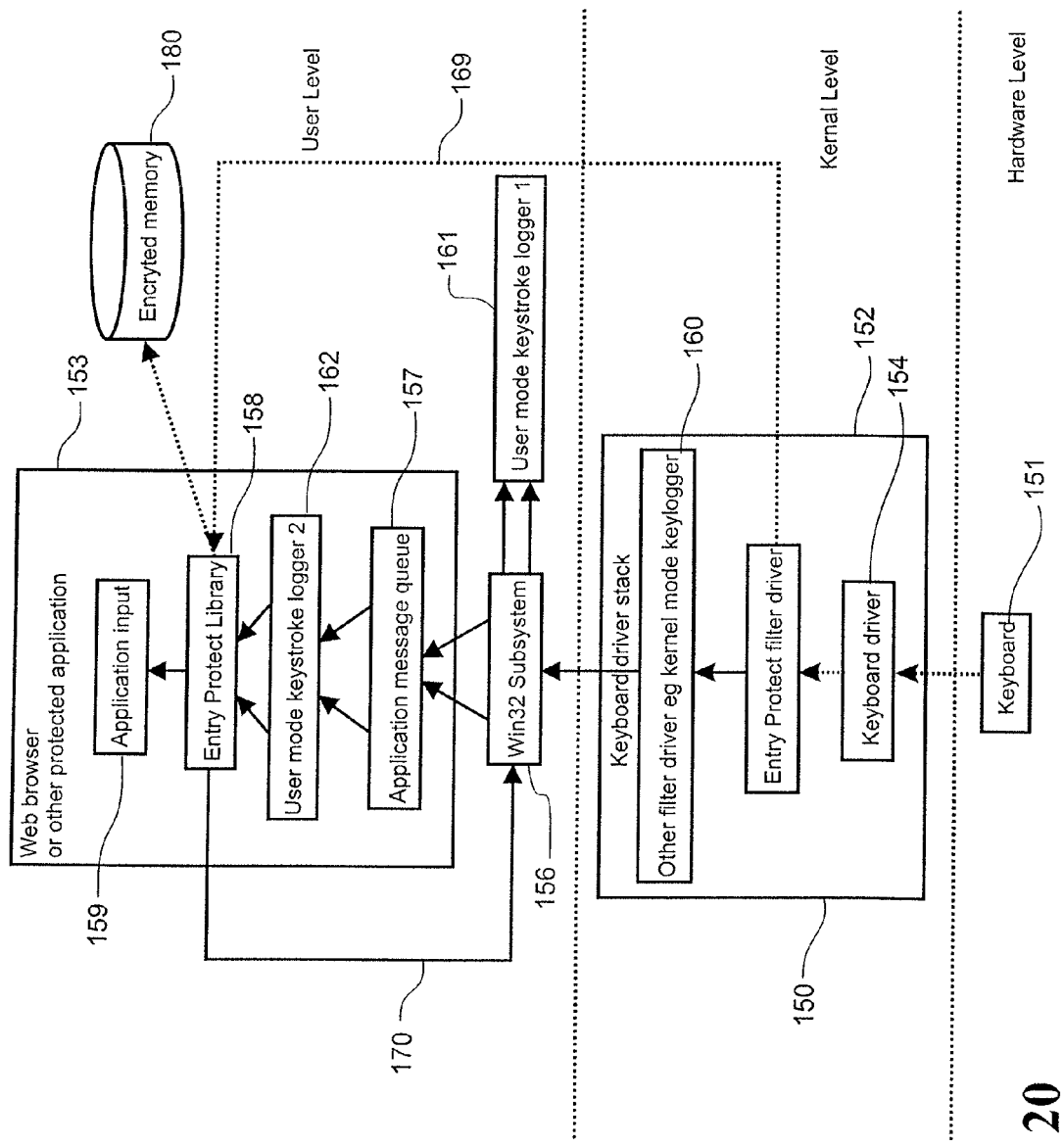
FIG. 20 is a diagrammatic representation of the software structure showing an alternative embodiment of the invention for circumventing keylogger programs using non-kernel keystroke replacement and/or random keystroke replacement.

An alternative embodiment is shown in FIG. 20. This operates in much the same manner, but the protection library 158 can receive actual keystrokes direct from a filter driver 155 (rather than from memory), which is included in the driver stack.

Another alternative would be to only store the keystrokes in memory. No additional keystrokes would be generated, and no encryption would take place of the stored keystrokes.

In another alternative, the keystrokes could be encrypted before storage, but no additional keystrokes would be generated.

Figure 21:
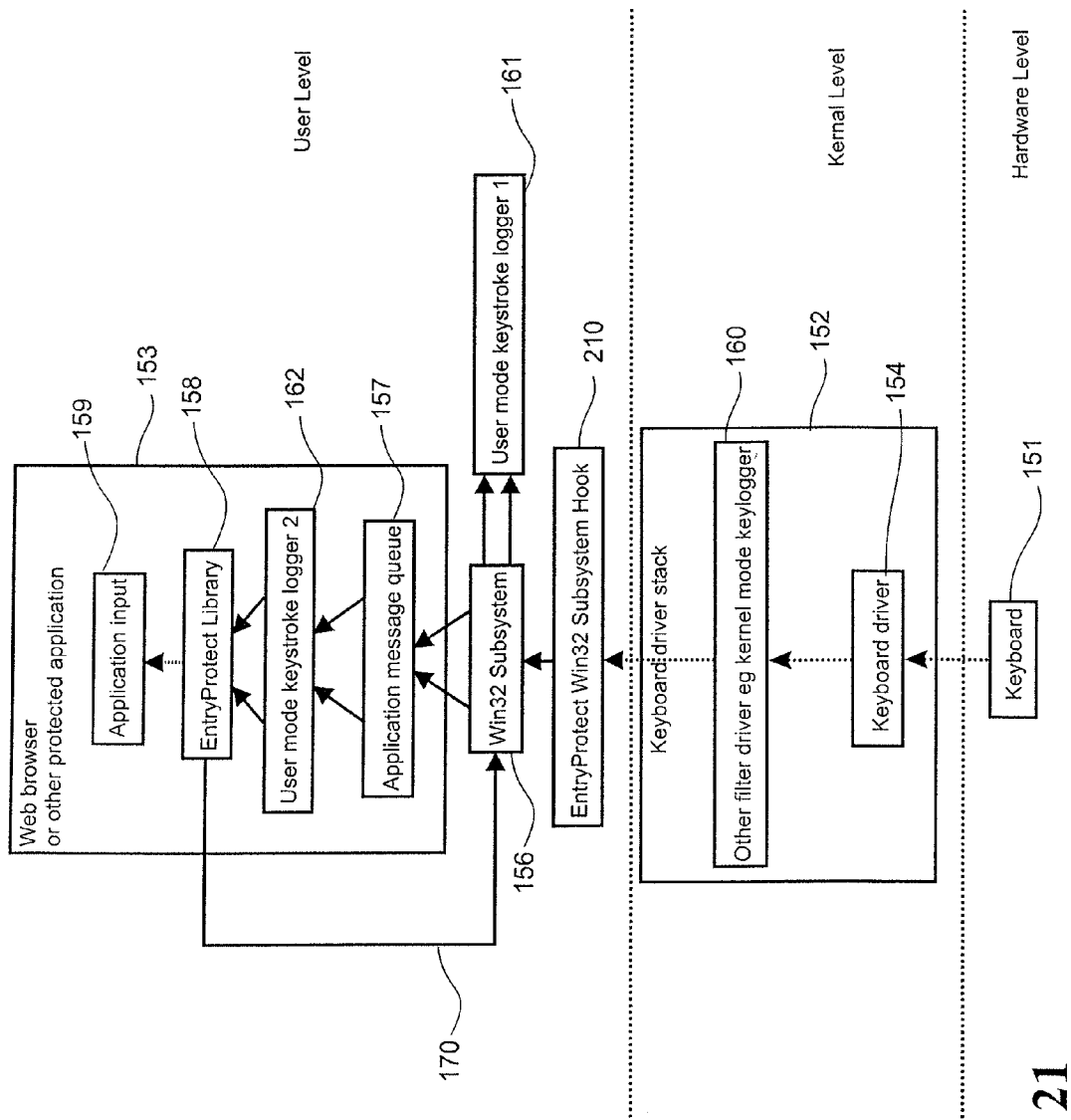
FIG. 21 is a diagrammatic representation of the software structure showing an alternative embodiment of the invention for circumventing keylogger programs using non-kernel keystroke replacement using a function and/or random keystroke replacement.

A further aspect of this invention will be described with reference to FIG. 21. This involves non-kernel level replacement/conversion of keystrokes. In this embodiment, the each keyboard keystroke output is passed to the keyboard driver, and on to a Win32 subsystem hook 210. This uses a function to randomly replace the keystrokes with other keystrokes. Further, the protection library 158 generates random keystrokes which are passed to the subsystem. The combination of random keystrokes are interspersed with random replacement keystrokes. The protection library regenerates the original keystrokes and pass these to the application input.

Operation of this embodiment will be described in more detail with reference to FIG. 21. FIG. 21 shows a computer system 150 comprising a keyboard 151 that passes its output to a keyboard driver stack 152. That stack comprises a keyboard driver 154 (and possibly an unwanted keylogger 160). The output of the keyboard driver stack 152 is passed to a Win32 subsystem hook 210. This contains a function, such as a random keystroke generator, or some other function for generating replacement keystrokes. It takes the keystrokes as input and in response generates replacement keystrokes using the function. These replacement keystrokes are passed onto the Win32 subsystem 156 through to the protection library 158. The Win32 subsystem also receives randomly generated keystrokes from the protection library 158, and intersperses these with the random replacement keystrokes. These keystrokes are passed through the message queue up to the protection library 158. The protection library contains the inverse function that generates the replacement keystrokes. The protection library can remove the random keystrokes from the stream and then use the inverse function on the remaining keystrokes to regenerate the original keystrokes. These are passed to the application input 159.

The present embodiment is arranged to prevent a subsystem level keystroke logger or an application level keystroke logger from successfully harvesting keyboard output. The actual keystrokes are removed from the path between the subsystem and the protection library. Any keylogger will harvest the replacement/random keystrokes, as opposed to the actual keystrokes.

Figure 22:
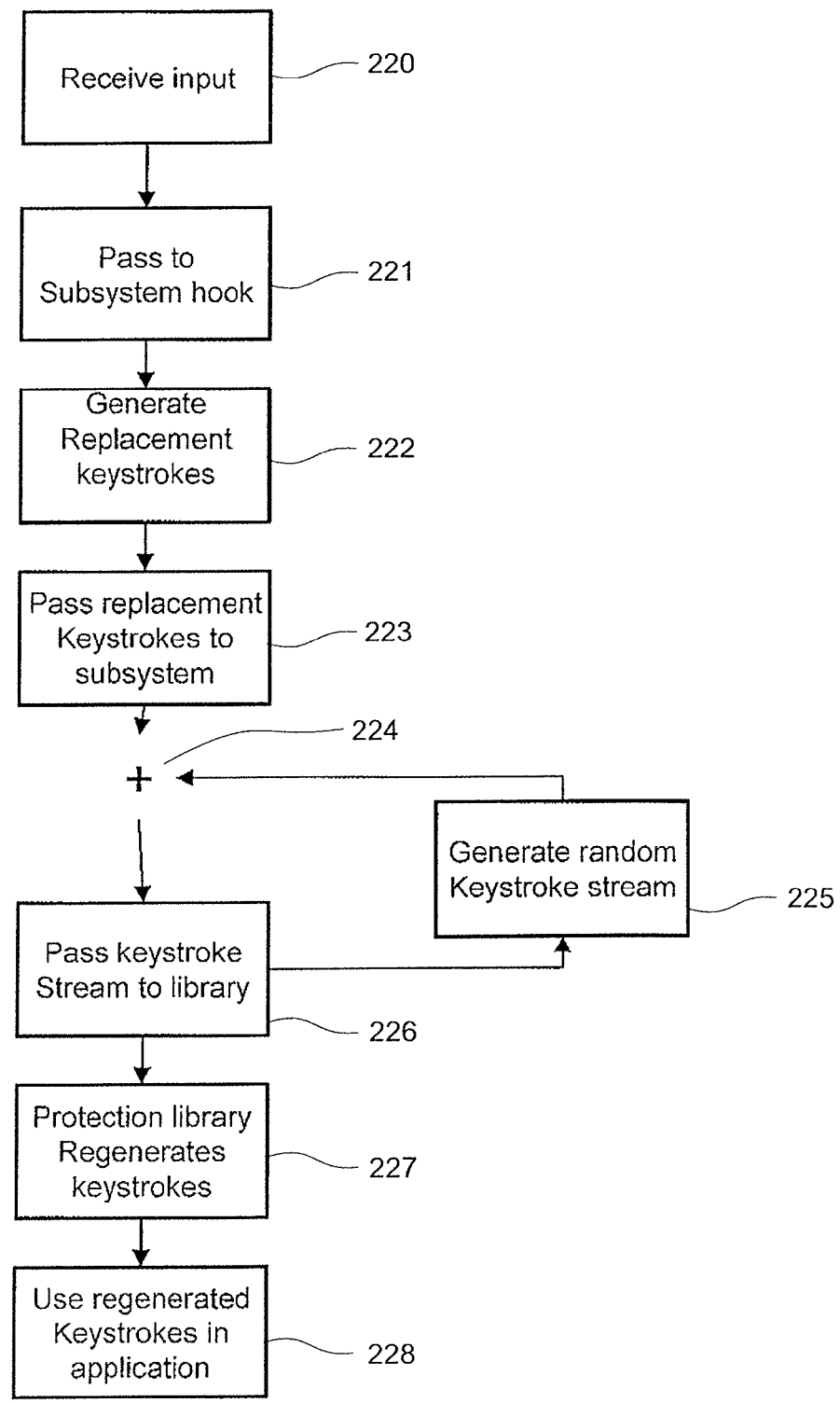
FIG. 22 is a flow chart of a method for circumventing keylogger programs by non-kernel keystroke replacement using a function and random keystroke generation.

Operation of this embodiment of the invention will now be described with reference to FIG. 22. A user enters keystrokes into the keyboard, step 220, and this is passed to the keyboard driver. The keyboard driver passes the keystrokes to the subsystem hook, step 221, which generates replacement characters using a function, step 222. These are passed on the Win32 subsystem, step 223. The protection library 158 generates random keystrokes, step 225, and also passes these to the Win32 subsystem, step 224. The subsystem combines, step 224, the streams and passes them on to the message queue and protection library, step 226. The protection library strips out the random keystrokes, and uses the inverse function to regenerate the actual keystrokes from the remaining keystrokes, step 227. These are passed on to the application input, step 228.

As an example, the process might do the following: the user inputs the key sequence "abc". Using the function, the Win32 subsystem hook converts this to the keystrokes "xyz". In parallel, the protection library generates the keystrokes "jklmnopqrstuv". The two are combined to produce the stream "jkxmnopyqrsztuv". In reverse, the "lmnopqrstuv" are stripped from this, and the remaining "xyz" are converted back to "abc" using the inverse function.

In an alternative, the actual keystrokes would be stored in memory. Rather than stripping out the random keystrokes, and regenerating the original keystrokes from the remaining keystrokes, the original keystrokes would instead be obtained from memory.

The invention claimed is:

1. A system for preventing keyboard sniffer programs from intercepting keystrokes input via a keyboard comprising:
   a computer system with an operating system and a user level environment for applications,
   a keyboard driver at a kernel level in the operating system for receiving input keystrokes from a keyboard connected or connectable to the computer system,
   a keystroke memory at the kernel level in the operating system configured to receive and store the input keystrokes from the keyboard driver,
   a driver at the kernel level in the operating system configured to receive the input keystrokes from the keyboard driver and generating a replacement keystroke for each received input keystroke to pass to an application operating on the user level environment,
   an application operating on the user level environment requiring input from the keyboard and comprising:
   an application input,
   a message queue for receiving the replacement keystrokes from the driver,
   a protection library for receiving the input keystrokes from the keystroke memory and for passing the input keystrokes from the keystroke memory to the application input,
   such that:
   keystrokes input via the keyboard and received by the application input bypass any kernel level or user level keyboard sniffer programs, and
   any kernel level and/or user level keyboard sniffer programs only log replacement keystrokes generated by the driver.

2. The system according to claim 1 wherein a random stream of keystrokes is provided to the message queue to intersperse with the replacement keystrokes received from the driver, such that any user level keyboard sniffer programs only log replacement keystrokes generated by the driver interspersed with random keystrokes.

3. The system according to claim 2 wherein the protection library generates the random stream of keystrokes provided to the message queue.

4. The system according to claim 2 wherein the driver generates the random stream of keystrokes provided to the message queue.

5. A method of preventing keyboard sniffer programs from intercepting keystrokes input via a keyboard in a computer system with an operating system and a user level environment for applications, the method comprising the steps of
   receiving, at a keyboard driver at a kernel level in the operation system, input keystrokes from a keyboard,
   receiving and storing the input keystrokes from the keyboard driver in a keystroke memory at the kernel level in the operating system,
   receiving input keystrokes from the keyboard driver in a driver at the kernel level in the operating system and generating a replacement keystroke for each received input key stroke for passing to an application operating on the user level environment,
   receiving the replacement keystrokes from the driver at a message queue in the application,
   receiving the input keystrokes from the keystroke memory at a protection library in the applicant and passing the input keystrokes from the keystroke memory to an application input,
   wherein
   keystrokes input via the keyboard an received by the application input bypass any kernel level and/or user level keyboard sniffer programs, and
   any kernel level and/or user level keyboard sniffer programs only log replacement keystrokes generated by the driver.

6. The method according to claim 5 further comprising generating and providing a random stream of keystrokes to the message queue to intersperse with the replacement keystrokes received from the driver, such that any user level keyboard sniffer programs only log replacement keystrokes generated by the driver interspersed with random keystrokes.

7. The method according to claim 6 wherein the protection library generates the random stream of keystrokes provided to the message queue.

8. The method according to claim 6 wherein the driver generates the random stream of keystrokes provided to the message queue.

* * * * *